United States Patent
Ronkainen et al.

(10) Patent No.: US 11,513,590 B2
(45) Date of Patent: Nov. 29, 2022

(54) METHOD AND SYSTEM FOR GAZE-BASED CONTROL OF MIXED REALITY CONTENT

(71) Applicant: PCMS Holdings, Inc., Wilmington, DE (US)

(72) Inventors: Jussi Ronkainen, Oulu (FI); Jani Mantyjarvi, Oulunsalo (FI)

(73) Assignee: PCMS Holdings, Inc., Wilmington, DE (US)

( * ) Notice: Subject to any disclaimer, the term of this patent is extended or adjusted under 35 U.S.C. 154(b) by 0 days.

(21) Appl. No.: 17/048,985

(22) PCT Filed: Apr. 12, 2019

(86) PCT No.: PCT/US2019/027328
§ 371 (c)(1),
(2) Date: Oct. 19, 2020

(87) PCT Pub. No.: WO2019/204161
PCT Pub. Date: Oct. 24, 2019

(65) Prior Publication Data
US 2021/0240260 A1    Aug. 5, 2021

Related U.S. Application Data

(60) Provisional application No. 62/660,428, filed on Apr. 20, 2018.

(51) Int. Cl.
*G06F 3/01* (2006.01)
*G02B 27/00* (2006.01)
(Continued)

(52) U.S. Cl.
CPC ......... *G06F 3/013* (2013.01); *G02B 27/0093* (2013.01); *G02B 27/0172* (2013.01);
(Continued)

(58) Field of Classification Search
CPC .......... G06F 3/013; G06F 3/012; G06F 3/017; G02B 27/0172; G02B 27/0093;
(Continued)

(56) References Cited

U.S. PATENT DOCUMENTS 9,292,973 B2  3/2016 Bar-Zeev
9,575,321 B2  2/2017 Osterhout
(Continued)

FOREIGN PATENT DOCUMENTS

EP    2778842        9/2014
JP    2017138995 A   8/2017

OTHER PUBLICATIONS

Feit, Anna Maria, et al. "Toward Everyday Gaze Input: Accuracy and Precision of Eye Tracking and Implications for Design". In Proceedings of the 2017 CHI Conference on Human Factors in Computing Systems (CHI '17). ACM, New York, NY, USA, 1118-1130, 2017, DOI: https://doi.org/10.1145/3025453.3025599 (13 pages).

(Continued)

*Primary Examiner* — Alexander Eisen
*Assistant Examiner* — Kebede T Teshome
(74) *Attorney, Agent, or Firm* — Invention Mine LLC

(57) ABSTRACT

Systems and methods are presented for discovering and positioning content into augmented reality space. A method includes forming a three-dimensional (3D) map of surroundings of a user of an augmented reality (AR) head mounted display (HMD); determining a depth-wise location of a gaze point of a user based on eye gaze direction and eye vergence; determining a visual guidance line pathway in the 3D map; guiding an action of the user along the visual guidance line pathway at one or more identified focal points; and rendering a mixed reality (MR) object along the visual guidance line pathway at a location corresponding to a direction of the user's gaze.

20 Claims, 21 Drawing Sheets

(51) Int. Cl.
*G02B 27/01* (2006.01)
*G06T 19/00* (2011.01)
*G06T 19/20* (2011.01)

(52) U.S. Cl.
CPC .............. *G06F 3/012* (2013.01); *G06F 3/017* (2013.01); *G06T 19/006* (2013.01); *G06T 19/20* (2013.01); *G02B 2027/014* (2013.01); *G06T 2219/2004* (2013.01)

(58) Field of Classification Search
CPC . G02B 2027/014; G06T 19/006; G06T 19/20; G06T 2219/2004
See application file for complete search history.

(56) References Cited

U.S. PATENT DOCUMENTS

| | | | |
|---|---|---|---|
| 2013/0234926 A1* | 9/2013 | Rauber | G06F 3/04817 345/156 |
| 2014/0237366 A1* | 8/2014 | Poulos | G06F 3/011 715/728 |
| 2014/0361984 A1 | 12/2014 | Kim | |
| 2015/0103003 A1 | 4/2015 | Kerr | |
| 2016/0026253 A1 | 1/2016 | Bradski | |
| 2016/0110921 A1 | 4/2016 | Takahashi | |
| 2017/0060230 A1 | 3/2017 | Faaborg | |
| 2018/0268611 A1* | 9/2018 | Nourai | G06T 19/006 |

OTHER PUBLICATIONS

Nukarinen, Tomi, et al. Evaluation of HeadTurn: An Interaction Technique Using the Gaze and Head Turns. In Proceedings of the 9th Nordic Conference on Human-Computer Interaction (NordiCHI '16). ACM, New York, NY, USA, Article 43, 2016 (8 pages). DOI: https://doi.org/10.1145/2971485.2971490.

Špakov, Oleg, et al. "Enhanced gaze interaction using simple head gestures". In Proceedings of the 2012 ACM Conference on Ubiquitous Computing (UbiComp '12). ACM, New York, NY, USA, 2012, pp. 705-710. DOI=http://dx.doi.org/10.1145/2370216.2370369 (7 pages).

Jacob, Robert J. K. "The use of eye movements in human-computer interaction techniques: what you look at is what you get". ACM Transactions on Information Systems, vol. 9, No. 3 ,Apr. 1991, 152-169. DOI=http://dx.doi.org/10.1145/123078.128728 (18 pages).

Jimenez, J. et al. "Gaze-based Interaction for Virtual Environments". Journal of Universal Computer Science vol. 14 No. 19, (2008), 3085-3098 (14 pages).

Orlosky, Jason Edward. "Adaptive Display of Virtual Content for Improving Usability and Safety in Mixed and Augmented Reality". Jan. 2016, www.researchgate.net/profile/Jason_Orlosky/publication/289374840_Adaptive_Display_of_Virtual_Content_for_Improving_Usability_and_Safety_in_Mixed_and_Augmented_Reality/links/568bf1d008ae16c414a9cde7/Adaptive-Display-of-Virtual-Content-for-Improving-Usability-and-Safety-in-Mixed-and-Augmented-Reality.pdf (165 pages).

Toyama, Takumi, et al. "A natural interface for multi-focal plane head mounted displays using 3D gaze". May 2014. https://www.researchgate.net/publication/266657985_A_natural_interface_for_multi-focal_plane_head_mounted_displays_using_3D_gaze (8 pages).

Invitation to Pay Additional Fees, and Where Applicable, Protest Fee for PCT/US2019/027328 dated Jul. 18, 2019, (13 pages).

International Search Report and Written Opinion of the International Searching Authority for PCT/US2019/027328 dated Sep. 18, 2019, (19 pages).

International Preliminary Report on Patentability for PCT/US2019/027328 dated Oct. 20, 2020, (14 pages).

FechCrunch. Control your computer with your eyes, Jul. 16, 2016, https://youtu.be/5CHE8msmoP8 (last accessed Apr. 22, 2022) (Excerpted portion provided as a PDF from 0:40-1:13, providing transcript and screenshots for that portion.).

Remixed Reality. Product Review: Microsoft Hololens, Jun. 13, 2016. https://youtu.be/4VOFjzZuxm07tM37 (last accessed Apr. 22, 2022). (Excerpted portion provided as a PDF from 7:13 - 8:08, providing transcript and screenshots for that portion.).

\* cited by examiner

METHOD AND SYSTEM FOR GAZE-BASED CONTROL OF MIXED REALITY CONTENT

CROSS-REFERENCE TO RELATED APPLICATIONS

The present application is a national stage application under 35 U.S.C. § 371 of International Application No. PCT/US2019/027328, entitled "METHOD AND SYSTEM FOR GAZE-BASED CONTROL OF MIXED REALITY CONTENT," filed on Apr. 12, 2019, which claims benefit under 35 U.S.C. § 119(e) from U.S. Provisional Patent Application Ser. No. 62/660,428, entitled "Method And System For Gaze-Based Control Of Mixed Reality Content," filed Apr. 20, 2018, each of which is hereby incorporated by reference in its entirety.

BACKGROUND

In the field of mixed reality (MR) head mounted displays (HMDs) or goggles, there are interaction issues that need to be addressed. In particular, HMD users need to manipulate and control mixed reality/augmented reality (MR/AR) objects embedded into an environment. Enhanced control can relate to providing additional information, and presenting the information in a users field of view, while optimizing the view with respect to target device specifications, such as focally accurate viewing planes, and resolution.

User interface activities required for viewing the details of an AR/MR object, such as selecting the object, and moving it closer for a detailed view are currently typically done via a combination of modalities and gestures, such as selection via head direction, and manipulation via hand gestures. For example, to move an object closer with the Microsoft™ HoloLens™, the user has to do the following steps: 1. Turn his head towards an "adjust" tool icon on the corner of the object to move; 2. Activate the adjust tool by a finger tap; 3. Turn his head towards a "drag to move" icon that appears on the object; 4. Start moving the object by performing a tap-and-hold finger gesture; 5. Move the object by moving his hand; 6. Release the tap-and-hold finger gesture to drop the object; 7. Turn his head to a "done" icon on the object; and 8. Perform the finger-tap gesture to activate the "done" icon.

Although the finger tap and hand move gestures can be replaced by using a handheld gyro-based "clicker" controller, this approach is both laborious and conspicuous, and difficult in public locations.

For more natural interaction, the use of eye gaze is widely studied, originally as an input method for disabled people. Gaze tracking systems are also making their way into AR/MR HMDs; for example, Eyefluence™, owned by Google are building a gaze gesture based system with HMD manufacturers.

A number of interaction methods using gaze control have been researched, such as Gaze pointing, Gaze gestures, Dwell-based selection, Multimodal selection, Selection by following a moving object, Drag and drop, Rotary control and sliders, Switching windows, Image annotation, Reading, and Focus of attention. HMD-friendly approaches for multimodal object control have been reported in Evaluation of HeadTurn: An Interaction Technique Using the Gaze and Head Turns. In *Proceedings of the 9th Nordic Conference on Human-Computer Interaction* (NordiCHI 2016) and Enhanced gaze interaction using simple head gestures. In Proceedings of the 2012 *ACM Conference on Ubiquitous Computing* (UbiComp 2012), with alternative ways of interaction.

Focusing on the function of quickly examining an object, selecting and manipulating (moving) the object are of particular interest. The function resembles drag and drop using eye gaze, and some approaches have been described at least in "The use of eye movements in human-computer interaction techniques: what you look at is what you get." ACM Trans. Inf. Syst. 9, 2 (Jacob, April 1991) and Gaze-based Interaction for Virtual Environments. J. UCS, 14(19), 3085-3098 (Jimenez, Gutierrez, D., Latorre, 2008). However, the few reported studies focus on 2D actions only, and fail to consider the depth aspect, for example, movement of an object in 3D space, as would be required on an MR HMD device. Also, the approaches require a number of steps akin to the Hololens™ example above.

As MR content enhancement starts to become commonplace, MR HMD users will face difficulties in controlling how and when to display that content. Such content enhancement could be associated with practically any real-world or virtual content the user sees, such as street lights, traffic signs, shop signs and ads in shop windows, public notices, people, vehicles, etc.

Another problem with current solutions is that some sections in the user's view are better for displaying content enhancement than others. For example, real-life and virtual objects at different ranges occupy the users view, and the user may be on the move. Further restrictions may derive from hardware; gaze recognition and optical display resolution may set requirements to the area the enhanced content display requires. The user cannot be expected to decide each time where in the full extent of his view to place the content; current systems fail to identify suitable locations for the content, and show it there, and also fail to let the user quickly decide the display area.

Another issue is the limited optical capabilities of HMD devices. Current devices, such as the Microsoft Hololens™, have a single fixed focal plane, which causes a vergence-accommodation conflict with MR objects that do not reside on that plane. The conflict causes eye strain and slows down the users ability to determine the exact depth location of the object. HMDs with multiple focal planes are expected to become commercially available in the near future. With such devices, a user would benefit from being able to control the location of the content enhancement so that it is placed precisely on a focal plane. Current solutions lack some kind of a visual guide to focus on in order to control the position (especially depth) of an MR object with gaze alone.

There is a need to provide the user a quick and natural way to control the display of MR content enhancement objects, taking use of the knowledge of optically perfect (focally accurate) locations for the HW, with gaze alone.

Systems and methods set forth herein address these issues, and others.

SUMMARY

Systems and methods set forth herein provide embodiments that use gaze control to bring enhanced MR content pertaining to faraway objects closer to the user. The solution uses a vision guideline implemented as an MR object. The guideline contains points that help the user to focus his gaze, placed at depths equivalent to the focally correct viewing distances supported by device hardware. The enhanced MR content follows the user's gaze along the line, thus moving the content closer or farther from the user. The location and dimensions of the line are determined by the system, based on HW restrictions and existing real-life or MR objects in the users view.

One or more embodiments are directed to a method including forming a three-dimensional (3D) map of surroundings of a user of an augmented reality (AR) head mounted display (HMD); displaying a mixed reality (MR) object in the 3D map including a visual cue that content enhancement is available to the user for the object; activating the content enhancement according to user input to the HMD with respect to the visual cue; displaying a visual guidance line pathway in the 3D map; guiding an action of the user along the visual guidance line pathway at one or more identified focal points; and rendering the MR object along the visual guidance line pathway at a location corresponding to a direction of the users gaze.

In one or more embodiments, the activating the content enhancement according to user input to the HMD includes user input of one or more of a gaze, a head gesture, or a gaze dwelling on the content enhancement.

In one or more embodiments, the displaying the visual guidance line pathway in the 3D map includes displaying the one or more identified focal points as a plurality of focal plane indicators at a plurality of depths within the 3D map. In one or more embodiments, the rendering the MR object along the visual guidance line pathway at the location corresponding to the direction of the users gaze includes moving the enhancement object along the plurality of focal plane indicators at the plurality of depths to enlarge the MR object.

In one or more embodiments, the guiding the action of the user along the visual guidance line pathway at the one or more identified focal points includes providing the visual cue, wherein the visual cue includes a next suggested action for the user.

In one or more embodiments, the displaying the visual guidance line pathway in the 3D map includes determining a depth-wise location of a gaze point of a user based on eye gaze direction and eye vergence.

In one or more embodiments, a method includes forming a three-dimensional (3D) map of surroundings of a user of an augmented reality (AR) head mounted display (HMD); determining a depth-wise location of a gaze point of a user based on eye gaze direction and eye vergence; determining a visual guidance line pathway in the 3D map; guiding an action of the user along the visual guidance line pathway at one or more identified focal points; and rendering a mixed reality (MR) object along the visual guidance line pathway at a location corresponding to a direction of the users gaze.

In one embodiment, the one or more focal points along the visual guidance line pathway are determined by gaze tracking of the user.

In one embodiment, the one or more focal points along the visual guidance line pathway are determined according to one or more hardware restrictions of the HMD.

In one embodiment, the one or more focal points along the visual guidance line pathway are determined according to a distance of the MR object.

In one embodiment, the one or more focal points along the visual guidance line pathway are determined by a movement of the user.

In one embodiment, the determining the visual guidance line pathway in the 3D map is based on the depth-wise location of the gaze point of the user and available space in the 3D map. In one embodiment, the determining the visual guidance line pathway in the 3D map includes forming the visual guidance line pathway to avoid one or more identified objects in the 3D map.

In one embodiment, the determining the visual guidance line pathway in the 3D map includes altering the visual guidance line pathway according to movements of the user, including one or more of a head tilt, a head pitch, a head yaw, and a gesture.

In one embodiment, the determining the visual guidance line pathway in the 3D map includes altering the visual guidance line pathway according to one or more pivot points determined by a user gaze.

In one embodiment, the method also includes determining a number of points along the visual guidance line pathway as a function of available focal planes in the 3D map.

Another embodiment is directed to a system including a processor and a non-transitory computer-readable storage medium storing instructions operative, when executed on the processor, to perform functions including forming a three-dimensional (3D) map of surroundings of a user of an augmented reality (AR) head mounted display (HMD); determining a depth-wise location of a gaze point of a user based on eye gaze direction and eye vergence; determining a visual guidance line pathway in the 3D map; guiding an action of the user along the visual guidance line pathway at one or more identified focal points; and rendering a mixed reality (MR) object along the visual guidance line pathway at a location corresponding to a direction of the user's gaze.

In one or more embodiments of the system, the one or more focal points along the visual guidance line pathway are determined by gaze tracking of a user.

In one or more embodiments of the system, the one or more focal points along the visual guidance line pathway are determined according to one or more hardware restrictions of the HMD.

In one or more embodiments of the system, the one or more focal points along the visual guidance line pathway are determined according to a distance of the MR object.

In one or more embodiments of the system, the one or more focal points along the visual guidance line pathway are determined by a movement of the user.

In one or more embodiments of the system, the determining the visual guidance line pathway in the 3D map is based on the depth-wise location of the gaze point of the user and available space in the 3D map.

In one or more embodiments of the system, the determining the visual guidance line pathway in the 3D map includes forming the visual guidance line pathway to avoid one or more identified objects in the 3D map. In one or more embodiments of the system, the determining the visual guidance line pathway in the 3D map includes altering the visual guidance line pathway according to movements of the user, including one or more of a head tilt, a head pitch, a head yaw, and a gesture.

In one or more embodiments of the system, the determining the visual guidance line pathway in the 3D map includes altering the visual guidance line pathway according to pivot points determined by user gaze.

Another embodiment of the system is directed to the non-transitory computer-readable storage medium storing instructions operative, when executed on the processor, to perform additional functions including determining a number of points along the visual guidance line pathway as a function of available focal planes in the 3D map.

Another embodiment is directed to a system including a processor and a non-transitory computer-readable storage medium storing instructions operative, when executed on the processor, to perform functions including forming a three-dimensional (3D) map of surroundings of a user of an augmented reality (AR) head mounted display (HMD); displaying a mixed reality (MR) object in the 3D map including a visual cue that content enhancement is available to the user for the object; activating the content enhancement according to user input to the HMD with respect to the visual cue; displaying a visual guidance line pathway in the 3D map; guiding an action of the user along the visual guidance line pathway at one or more identified focal points; and rendering the MR object along the visual guidance line pathway at a location corresponding to a direction of the user's gaze.

In one or more embodiments of the system, the activating the content enhancement according to user input to the HMD includes user input of one or more of a gaze, a head gesture, or a gaze dwelling on the content enhancement.

In one or more embodiments of the system, the displaying the visual guidance line pathway in the 3D map includes displaying the one or more identified focal points as a plurality of focal plane indicators at a plurality of depths within the 3D map.

In one or more embodiments of the system, the rendering the MR object along the visual guidance line pathway at the location corresponding to the direction of the users gaze includes moving the enhancement object along the plurality of focal plane indicators at the plurality of depths to enlarge the MR object.

In one or more embodiments of the system, the guiding the action of the user along the visual guidance line pathway at the one or more identified focal points includes providing the visual cue, wherein the visual cue includes a next suggested action for the user.

In one or more embodiments of the system, the displaying the visual guidance line pathway in the 3D map includes determining a depth-wise location of a gaze point of a user based on eye gaze direction and eye vergence.

Another embodiment is directed to a method for rendering a visual guidance pathway including forming a three-dimensional (3D) map of surroundings of a user of an augmented reality (AR) head mounted display (HMD); determining a depth-wise location of a gaze point of a user based on eye gaze direction and eye vergence; determining a visual guidance line pathway in the 3D map; and rendering one or more mixed reality (MR) objects along the visual guidance line pathway at locations corresponding to a direction of the user's gaze, while avoiding one or more preexisting objects in the 3D map of the surroundings.

In one or more embodiments of the method, the visual guidance line pathway is placed in determined available space within the 3D map of the surroundings.

In one or more embodiments of the method, the one or more preexisting objects include one or more real-world objects and existing MR objects.

DETAILED DESCRIPTION

Embodiments herein provide systems and methods to enable a user of virtual and mixed reality devices to decide whether to show content enhancement, and if so, enables users to very quickly and effortlessly control how much to see, i.e., if the content enhancement seems interesting a user can pull it closer for closer inspection, but also be able to reject the enhancement if on closer inspection it proves out to be uninteresting. In one embodiment, the distance is fully controllable by the user.

In some embodiments disclosed herein, little or no other interaction than the user's gaze is required to show content enhancement. As will be appreciated, constantly scanning our surroundings for information anyway, so having to use an additional input method such as a hand gesture to pull the content enhancement closer would be cumbersome and could draw unwanted attention in a crowd.

Figure 1:
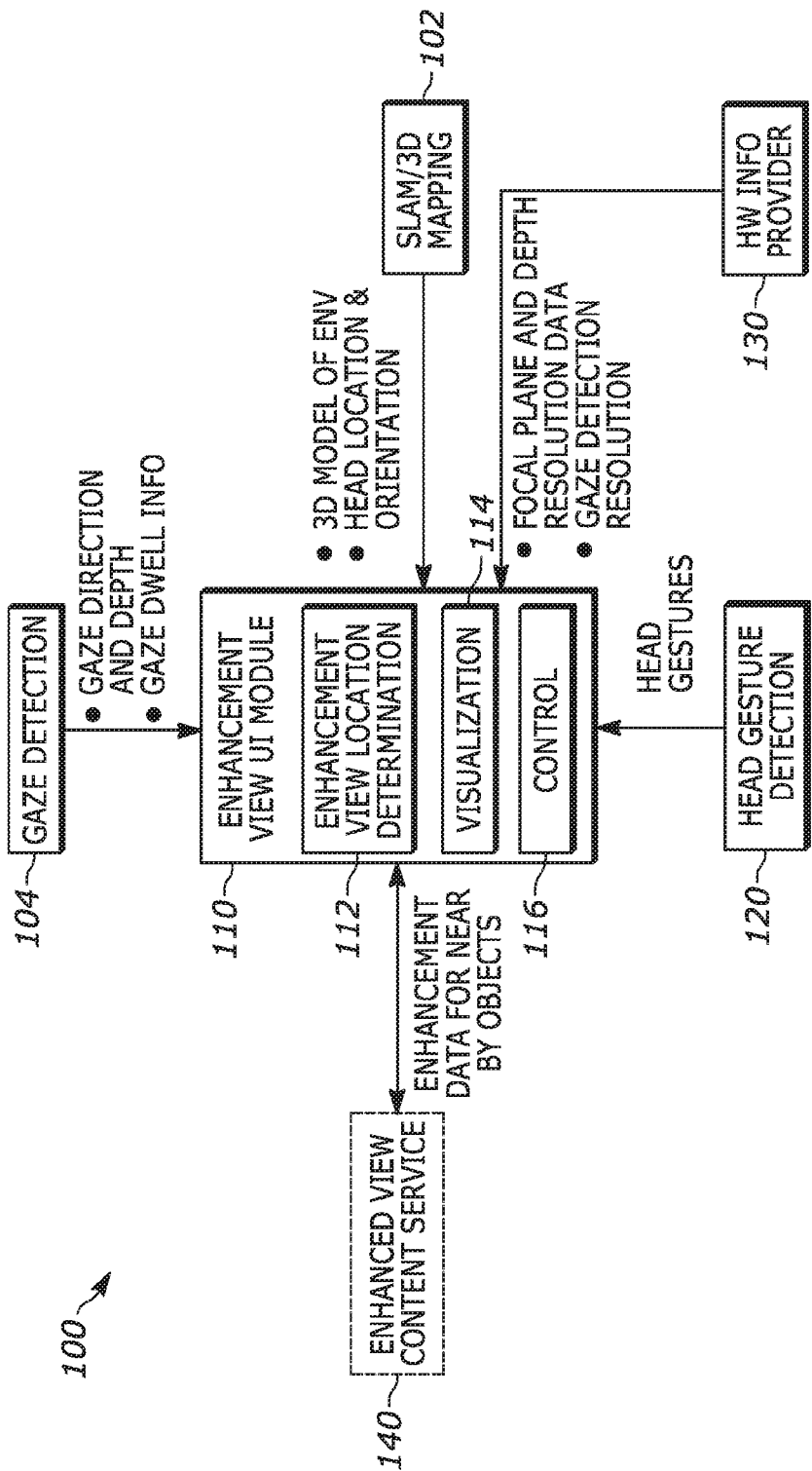
FIG. 1 depicts a solution architecture for gaze-based control of mixed reality (MR) content in accordance with an embodiment.

Referring to FIG. 1, an overview of a system 100 in accordance with embodiments includes several components, including Simultaneous Localization and Mapping (SLAM)/ 3D Mapping module 102, Gaze detection module 104, Enhancement View User Interface Module 110, Head Gesture Detection module 120, Hardware Information Provider module 130, and Enhanced View Content Service module 140. Enhancement View User Interface module 110 includes an enhancement view location determination module 112, a visualization module 114 and a control module 116.

The SLAM/3D mapping module 102 maintains a 3D model of the user's surroundings, and the user's position within the 3D model, including head position and orientation. Embodiments herein include the use of any suitable technique for maintaining a 3D model of a user's surroundings, such as structured infrared light patterns, stereo cameras, monocular visual odometry, time-of-flight cameras or the like.

The gaze detection module 104 recognizes the direction of the user's gaze, including vergence information to determine the depth where the user is looking. The gaze detection module 104 also determines how long and how comprehensively the user's gaze has dwelled on an object. Dwell times for both the original, non-enhanced MR or real-life object, and the enhanced MR object are detected.

Enhancement View User Interface module 110, includes Enhancement View Location Determination module 112 that establishes potential locations in the 3D space around the user for the necessary controls for an enhancement view. Criteria may include, e.g., existing real-life and MR objects, minimum eye movement and gaze detection resolution requirements, and the movement of the user. User preferences may also be considered, such as a preference to display the enhancement view above rather than at or below eye level. Also included in the Enhancement View User Interface Module 110 is a Visualization module 114 that renders all mixed reality (MR) content, and in embodiments provide functionalities including visual cues of directions so that the user may activate the content enhancement feature, rendering the vision guideline, guiding the user's action via highlighting available and recommended next actions, and rendering the enhanced content MR object along the vision guideline at a location corresponding the user's gaze direction.

Control module 116 within the Enhancement View User Interface (UI) module 110 provides functionalities including obtaining a list of available enhancements near the user (e.g., by querying the optional Enhanced View Content Service 140). Among the available enhancements, requesting from the Location Determination module 112 which enhancements are possible to display; and for possible enhancements, detecting enhancement start gestures (gaze dwell and/or other methods known in the art, such as gaze plus head gesture plus hand gesture combinations), as well as an indicated direction for the enhancement view; activating the enhancement view and controlling the location of the enhancement object along the vision guidance line; determining and highlighting suggested next actions, for example, when the user is moving the enhancement object closer, the next focally correct snap point on the vision guidance line may be highlighted; using gaze dwell and a "visual consumption" metric from the Gaze Detection module 104, estimating whether the user has paid enough attention to the enhancement object so that it can be removed from view if necessary.

In one embodiment, the gesture for ending the enhancement view can include having a user turn gaze away from the enhancement object, after the "visual consumption" metric has been met; having a user turn head away; having a user move the enhancement object back to its original location using his gaze; and/or a hand gesture.

In one embodiment, a hardware information provider delivers hardware-based restrictions that are relevant in calculating the space needed for showing a vision guideline, as well as the depths of the focally accurate display planes so that visual cues ("snap points") can be rendered for the user at those planes along the guideline.

Relevant hardware restrictions are, at least, the number of focally accurate planes supported by device optics, and gaze detection resolution. For example, in one embodiment, if the hardware supports five focal planes, the guideline shows five corresponding points. If the hardware further supports very accurate gaze tracking, the points may almost overlap in the user's view. With lesser gaze tracing accuracy, in an embodiment, the points are farther apart x/y-wise in order to be properly recognized from each other. Thus, the line in some embodiments occupies more space in the users view (in left-right and/or up-down directions).

FIG. 1 also illustrates head gesture detection via head gesture detection module 120. In an embodiment, the head gesture detection continuously monitors the users head movements, and reports recognized head gestures to the UI control module 116. In an embodiment, the control module 116 may use the information, e.g., in conjunction with simultaneous gaze direction/dwell information to determine activation, control, and deactivation events for the view enhancement feature.

In one embodiment, an Enhanced View Content Service 140 is an external service that provides information of available enhanced MR content for nearby real-life and MR objects.

The Enhanced View Content Service 140 provides a quick and simple way to get a detail view of a faraway MR or real-life object. A user can determine how near (and thus, how big) the object is allowed in his view and has full control of an event with no automatic popups. In one embodiment, to accommodate for hardware restrictions that would otherwise disturb a user, when hardware supports only a limited number of focal planes, the user is shown where those planes are, and given the option to place content there for optimal viewing.

The indication of focal planes is beneficial to a user because the eye is quickest to focus on those planes, and only requires a short time to grasp relevant details.

Figure 2:
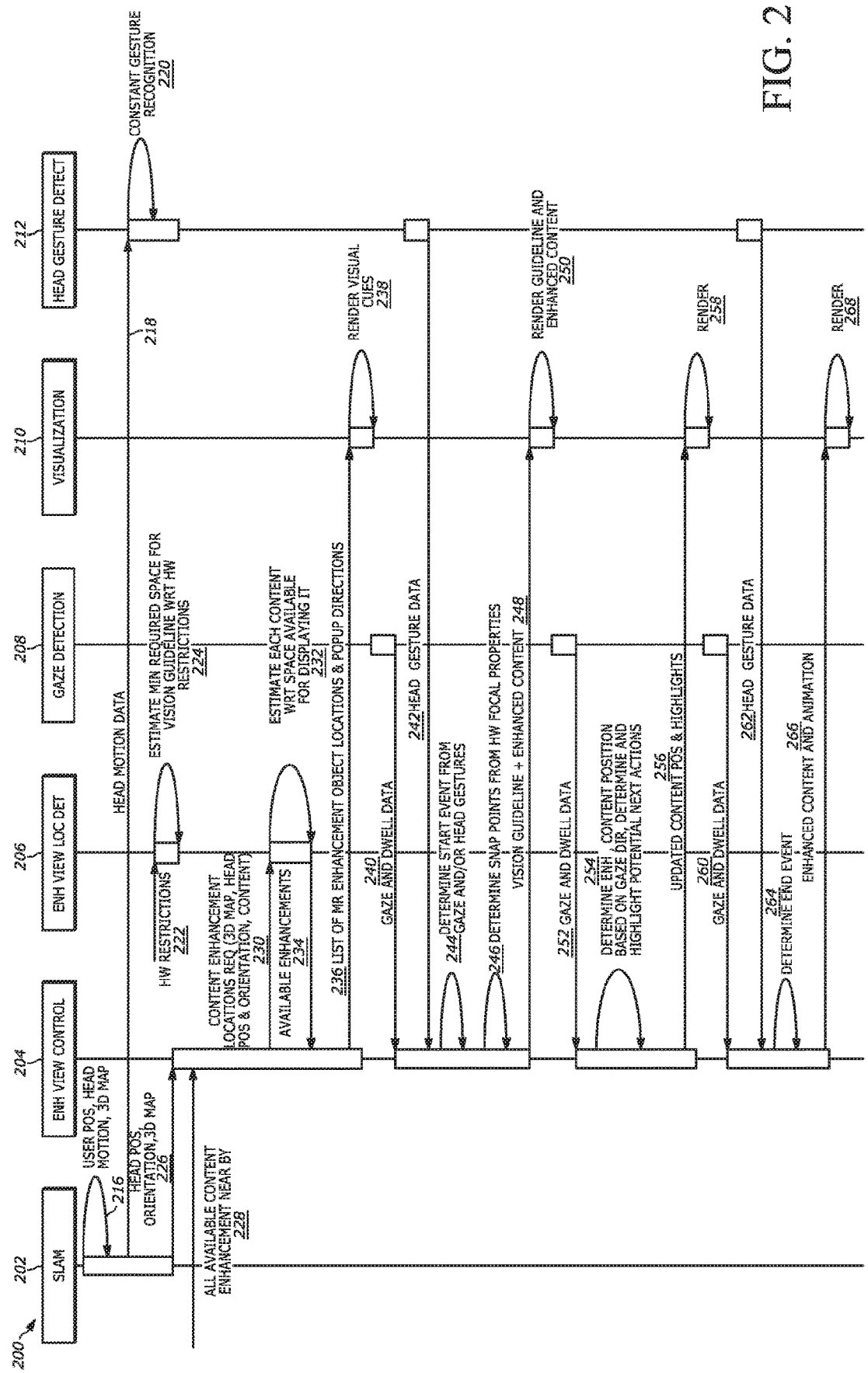
FIG. 2 depicts a process for activating, controlling and deactivating the vision guideline for controlling an MR object with gaze and head movement in accordance with an embodiment.

Referring now to FIG. 2, a flow diagram illustrates a process 200 for gaze-based depth control of a mixed reality (MR) object. Specifically, the flow diagram describes the process for activating, controlling and deactivating MR content enhancements using gaze and head movement.

As shown, FIG. 2 illustrates a process that enables interaction between SLAM module 202, enhanced view control module 204, enhanced view location detection module 206, gaze detection module 208, visualization module 210 and head gesture detection module 212. Within SLAM module 202 a user position, head motion and 3D mapping 216 is performed. After a 3D mapping is established, head motion data 218 is transmitted to head gesture detection module 212 where constant gesture recognition 220 takes place using head gesture detection module 212.

Next, head position orientation and 3D map 226 are provided to enhanced view control 204, which also receives all available content enhancements 228 that may be nearby. Enhanced View Location Detection module 206 receives hardware restrictions 222, and then estimates a minimum required space for vision guidelines with respect to any hardware restrictions 224.

Within Enhanced View Control module 204, potential content enhancement locations 230 are requested from the Enhanced View Location Detection module 206, along with pertinent information such as 3D map, head position and orientation and content to be displayed.

Enhanced View Location Detection module 206 estimates each content with respect to space available for display and, among the list of content elements 234, provides those that are possible to display within the space available 232, to the Enhanced View Control module 204.

Next, Enhanced View Control module 204 provides a list of MR enhancement object locations and any popup directions 236 to Visualization module 210, which then renders any visual cues 238.

Next, Gaze Detection module 208 provides gaze and dwell data 240 to Enhanced View Control Module 204, which also receives head gesture data 242 from Head Gesture Detection module 212. Within Enhanced View Control module 204, a determination is made as to start an event based on data 244 from either Gaze Detection module 208 and/or Head Gesture Detection module 212. Also, Enhanced View Control module 204 determines snap points from any hardware focal properties 246. Next, Enhanced View Control module 204 provides a vision guideline and enhanced content 248 which is provided to Visualization module 210. Visualization module 210 renders the guideline and enhanced content 250.

Next, Enhanced View control module 204 receives gaze and dwell data 252 from Gaze Detection module 208, which is used to determine enhanced content position based on gaze direction and determine and highlight potential next actions 254. Any updated content, position and highlights are then provided to Visualization module 210 for rendering 258.

Gaze and dwell data 260 is repeatedly received from Gaze Detection module 208, as is head gesture data 262 from Head Gesture Detection module 212.

Enhanced View Control module 204 next determines an end event 264 and provides any enhanced content end animation 266 for rendering 268 to Visualization module 210.

According to embodiments described herein, the system continuously performs a background content enhancement scan. The system continuously monitors the user's location, head and gaze direction in order to determine whether there are objects in the users vicinity that have MR content enhancements that can be brought to the users view using the system. The determination can be based on, e.g., geolocation based search to a (remote) database with enhanced object locations.

Embodiments also relate to determining the potential for displaying content enhancements. On obtaining information of enhanced objects in the user's vicinity, the system continuously maintains information about whether and where the enhanced content could be brought to the user's view. The 3D space around the user that can potentially be used for enhanced content placement may initially contain all the space visible to the user, or be limited to specific viewing areas only. For example, the area right above and below the user's eye level could be ruled out in some embodiments.

According to some embodiments, whether content enhancements are brought to a user's view is determined by considering different parameters that may reduce the usable enhanced content display area. For example, the 3D space around the user is considered. The system performs SLAM to determine the locations of real-life objects near the user. Locations with real-life obstacles are ruled out as potential locations for displaying enhanced content. Recognized real-life objects may in addition be tagged as objects that must not be occluded.

Another parameter considered includes MR objects in the user's view. 3D space in the user's view already occupied by MR objects can be avoided according to an embodiment. In general, occlusion of existing MR objects is also avoided. Task, activity or other priority based metrics may, however, be used to determine whether the enhanced content view may occlude existing MR content, such as for a brief period of time.

Another parameter considered includes eye movement requirements. As the users eye movement (gaze) is used for controlling the enhanced object location, the system needs to determine the minimum extent of the vision guidance line in the user's view so that gaze detection can distinguish between the vision control points. The minimum extent may be determined by at least the following properties: gaze tracking accuracy, which can be a hardware restriction, the number of points to distinguish, which may correspond to the number focal planes provided by the optics, user movement, distance to the object that is enhanced, and the like.

After considering the space restrictions, one or more potential paths for the visual guideline are determined. The determination may be based on user preference (e.g. the user may prefer to use the top of his view for content enhancements), avoiding object occlusion, etc. The line may be linear, a spline, an arc, or any other form.

As shown in FIG. 2, the system also determines visual cues of available content enhancement. Objects that have been determined suitable for content enhancement in accordance with the process are highlighted to the user. The highlighting may be, e.g., a visual border or an icon. Specifically, the highlighting may contain an indication of available directions for a visual guideline.

Embodiments include different methods for a user to activate content enhancement of an object in virtual or mixed reality. Different methods include a gaze dwell on the object or a direction indicator, or by performing a head gesture or hand gesture while a gaze remains fixed on the object, and other methods known to those of skill in the art with the benefit of this disclosure. The direction of head movement may be used to select one of several proposed directions for a guidance line. If, for example, a leftward direction is proposed then object activation occurs by turning the head to the left. Alternatively, after the guidance line becomes visible, head yaw/pitch such as a with gaze still fixed to the object, could be used to fine-tune the location of the line.

In some embodiments, content enhancement activation displays the selected vision guidance line, showing markers at optimal viewing distances. The enhanced object comes into view, at or close to the location of the original object. In some embodiments, the enhanced object is fixed to the vision guidance line from a corner so that the object, the line, and the markers can be seen at all times.

In one or more embodiments, a determined visual guidance line may be displayed, but additional markers or snap-to points are not displayed along a visual guidance line. In such embodiments, snap-to points may be maintained internally and a snap-to effect for moving and displaying the enhanced content may still be maintained as the users gaze is shifted along a visual guidance line, even though corresponding markers are not visually displayed.

As one of skill in the art with benefit of this disclosure will appreciate, the visual guidance line can be optional. For example, in one or more embodiments, a visual guidance line is not displayed but additional markers or snap-to points are displayed, thereby making the visual guidance line effectively invisible. Thus, the function of moving the enhanced content from point to point along the visual guidance line changes in response to the user's gaze as if the visual guidance line is present but not displayed.

In other embodiments, neither the determined visual guidance line, nor the markers or snap-to points are displayed. Instead, the function of moving the enhanced content from point to point along a determined visual guidance line in response to changes in a user's gaze is performed even though the guidance line and associated markers or snap-to points are not visible to the user. In one or more embodiments, a reduced set of markers or snap to points may be displayed to give the user a minimal visual cue for moving the enhanced content. For example, markers or snap-to points that are adjacent to a current position of the enhanced content may be displayed adaptively as the enhanced content is moved so that a user has a minimal visible indication of where content may be moved next using a shift in user gaze.

In some embodiments, the vision guidance line is fixed with respect to the pivot point of the users head/neck. Thus, if the user moves his head as opposed to yaw/pitch, the guidance line moves along, with the origin of the line fixed to the source (object that is being enhanced).

One or more embodiments include depth control. In some embodiments, the process enables a user to control the depth-wise location of the enhancement object with a gaze by different methods. In one embodiment, the system recognizes that the user's gaze is within predefined bounds from the vision guidance line, and thus should be used to control the position of the enhancement object. The users gaze direction and eye vergence are used to determine the location of the enhancement object along the line. Optionally, the accommodation of the user's eye may be used in addition to determine the focal depth related to what the user is looking at.

In one embodiment, the enhancement object is moved to the corresponding location on the guidance line. The next optimal viewing location is highlighted on the line, to encourage the user to move the object to that location. At optimal viewing locations, a magnetism or snap effect may be used to keep the object at those locations, which may require extra eye movement to move past that point.

In one embodiment, depth control of the object stops when the gaze leaves predefined bounds, such as when a user looks at the object instead of the line. Depth control may continue if the user looks back at the line.

In one embodiment, the system keeps track of how long and/or how intensively a user has looked at enhanced content to determine whether the content can be discarded once the user looks away. Otherwise, normal quick movements of the head such as glancing at a honking car could unintentionally hide the enhanced content.

In one embodiment, ending display of enhanced content can be performed via a gesture, such as fixing gaze on a point on the enhanced object, and turning head towards the far end of the vision guidance line. In another embodiment, ending display occurs by a user turning the head and/or a gaze away from the enhanced object after content timeout.

Other methods of ending display of enhanced content include a user using gaze to move the enhanced object back to starting point using the vision guidance line or a hand gesture.

According to one or more embodiments, Visualization module 210 of FIG. 2 renders enhanced content, including a vision guidance line, which requires determining space required for displaying the line. The Enhanced View Location Detection module 206 shown in FIG. 2 determines whether the necessary controls for MR content enhancement can be drawn in the user's view, which can occur at all times, continuously or according to system requirements. Thus, in some embodiments, the module 206 determines the minimum required dimensions for the line in the user's view, and any real or virtual objects the line needs to avoid.

The minimum dimensions for the vision guidance line are determined according to embodiments by determining the number of guidance points to draw. The number of guidance points may be the total number of focally correct planes supported by a device's hardware, a subset of the planes, or, if the number of planes is low, the list of points may contain interpolated points to provide enough guidance points. In one embodiment, the interpolated points may be shown differently than the points corresponding to focally correct planes.

The minimum spacing between points according to one embodiment is according to the hardware needed by device gaze tracking to be able to detect each point. Further, minimum spacing can be affected by other factors such as additional movement to the user's head caused by movement, or other environmental factors.

Figure 3:
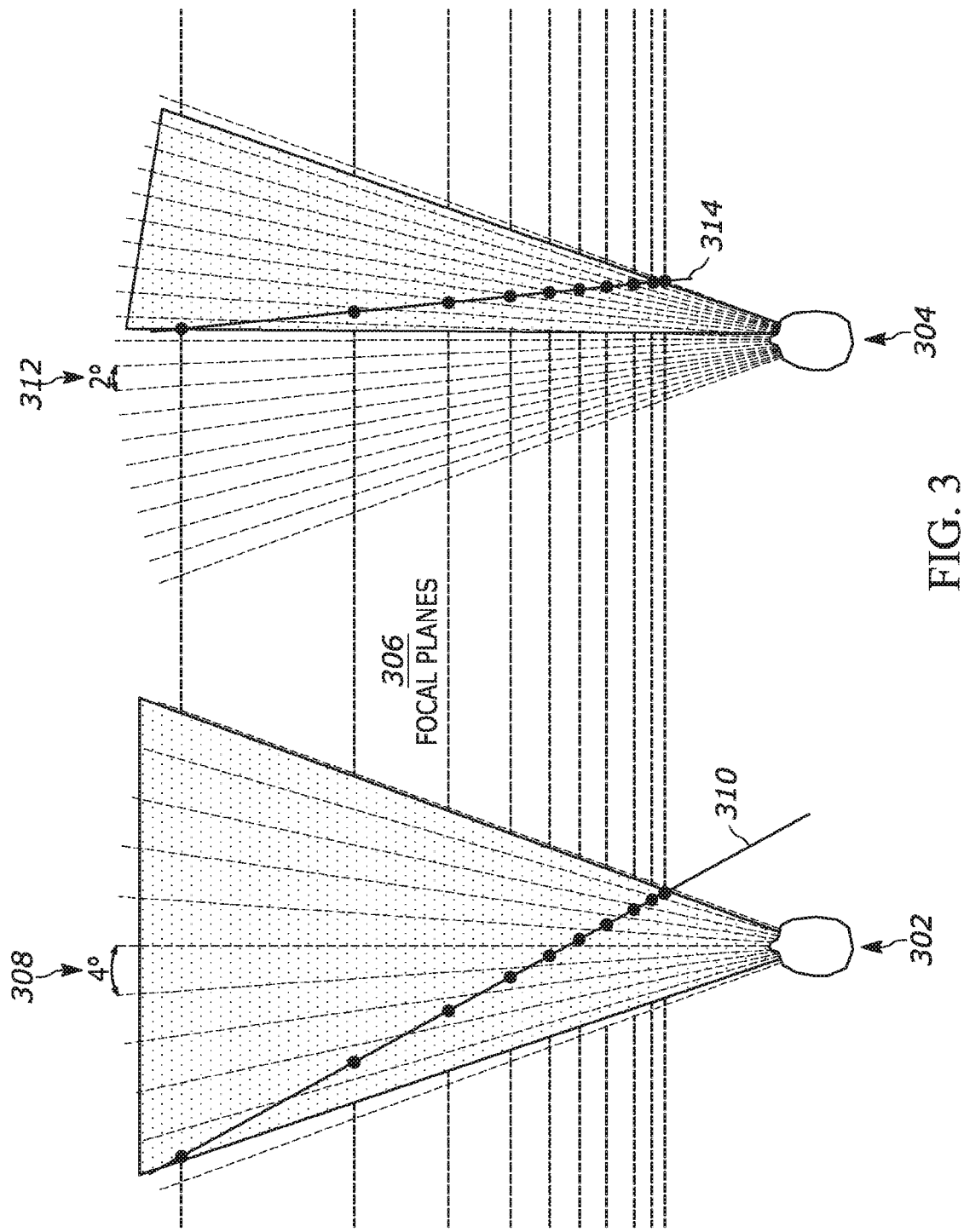
FIG. 3 depicts a field of view illustrating determination of a minimum required width of a vision guidance line in a user's view in accordance with an embodiment.

Referring to FIG. 3, a method for determining a required width of the vision guidance line in the user's view is illustrated. As shown, FIG. 3 shows an illustration of ten focally correct planes 306 in two different user views (302) and (304). As shown, the original location of the enhancement object is at the location furthest from the user. FIG. 3 shows in (302) a gaze detection resolution of 4 degrees 308, meaning that the total control line 310 must occupy approximately 40 degrees of eye movement in the user's view and spaced points along the control line. FIG. 3 shows in (304), a 2 degree resolution 312, with the control line 314 that covers half of a user view. In FIG. 3, the movement is solely on the horizontal axis; by using both horizontal and vertical movement, the extremities of the user's eye movements can be reduced.

Figure 4:
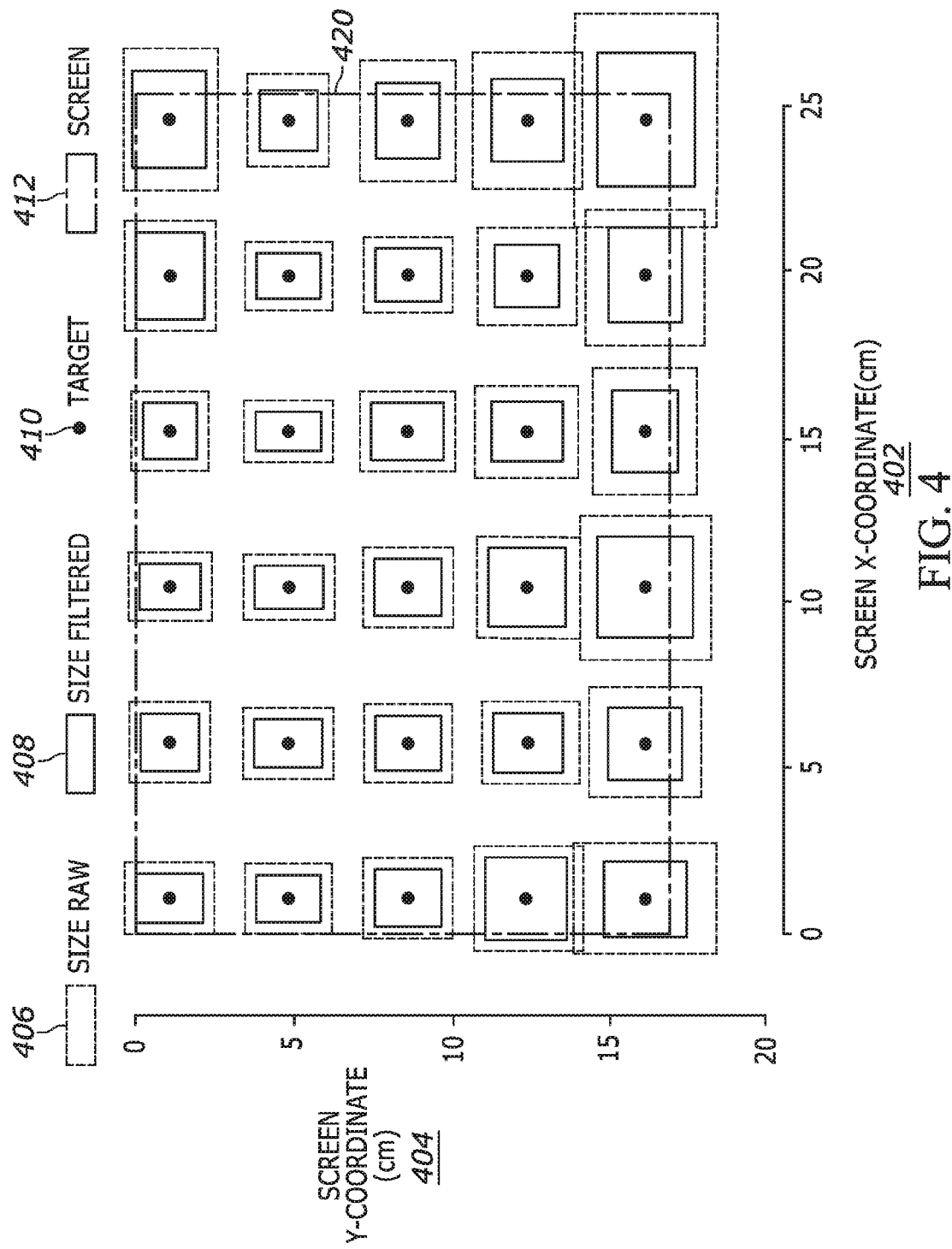
FIG. 4 depicts a graph illustrating variations in gaze control accuracy adapted from conference paper "Toward Everyday Gaze Input: Accuracy and Precision of Eye Tracking and Implications for Design," CHI 2017, May 6-11, 2017, p. 1125.

Referring now to FIG. 4, a graph illustrates variations in gaze control accuracy. The graph is adapted from conference paper, "Toward Everyday Gaze Input: Accuracy and Precision of Eye Tracking and Implications for Design," Feit et al., CHI 2017, May 6-11, 2017, p. 1125. As shown, the graph demonstrates that gaze control accuracy can vary for different reasons, such as viewing angle. Embodiments herein accommodate for the issues shown in FIG. 4. For example, the resolution of gaze control accuracy may also vary in different parts of the field of view along an x-coordinate 402 and a y-coordinate 404. Shown are size raw 406, size filtered 408, target points 410, and screen size 412 and border line 420.

In accordance with an embodiment of a method, after the minimum length for the guidance line has been established, candidate paths for the line in the users view are determined. The origin, such as a far end, of the path is at the object to be enhanced, and the near end is fixed in relation to the user's head. Path determination considers the 3D space occupied by real-world objects and existing MR objects in the user's view so that the guidance line does not clash with existing objects. Further criteria for choosing a path for the vision guidance line may include occlusion, such as the line avoids occluding some MR or real-life objects, and the users movement such that the line is drawn in the direction the user is moving to maintain his gaze in that general direction.

Figure 5:
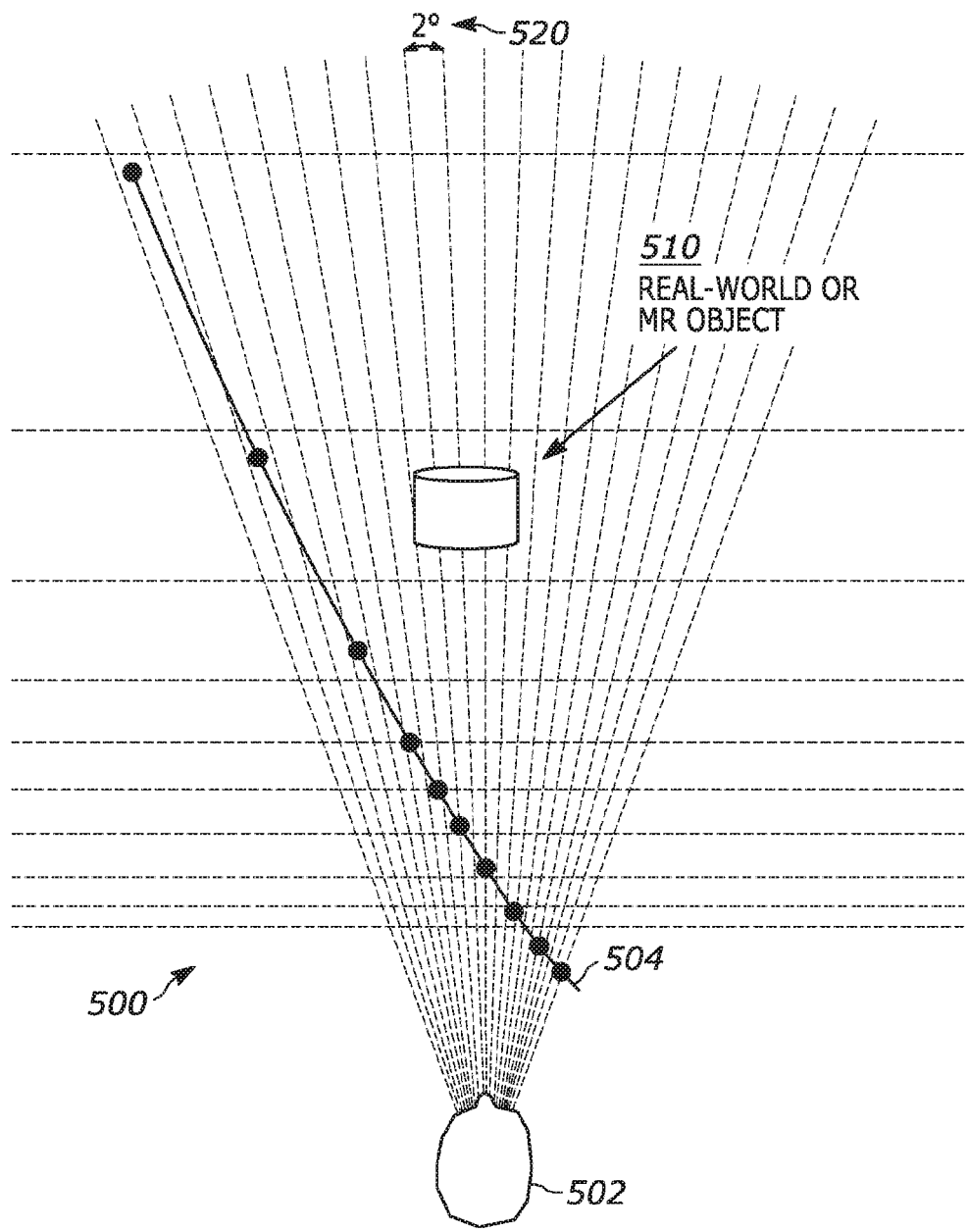
FIG. 5 depicts an example of non-linear vision guidance line to prevent the line from clashing with an existing object in accordance with an embodiment.

Referring now to FIG. 5, one embodiment is directed to bending the guidance line 504 of a user 502 to prevent it from clashing with an existing object 510. For example, if a straight line from start to finish would clash with the real-world or MR object location, bending would be appropriate. FIG. 5 also illustrates a user view 500 showing 2 degrees of separation 520 between view lines, and how the guidance line can occupy more sideways directed area than would be strictly necessary to make a view less crowded or avoid clashing with an object. An alternative would be to draw the line in another direction entirely or, resolution permitting, drawing the line narrower in the user's view so that the line and an existing object can be shown side by side.

In some embodiments, a user 502 can control the location of the enhancement object with gaze by focusing on visible points of reference. In one embodiment, the visible points of reference are present regardless of whether the system has a limited or unlimited number of focal planes. In one embodiment, markers along the vision guidance line help focus on a next location instead of having to glide the focus continuously up and down the line.

In one embodiment, as the line by design covers a large distance in depth, all but the currently focused section are more or less out of focus. To prevent a next location on the line to focus on from being difficult to find, or requiring longer focus than necessary, the next location may be highlighted in sequence, to give a visual stimulus in the users peripheral vision.

Figure 6:
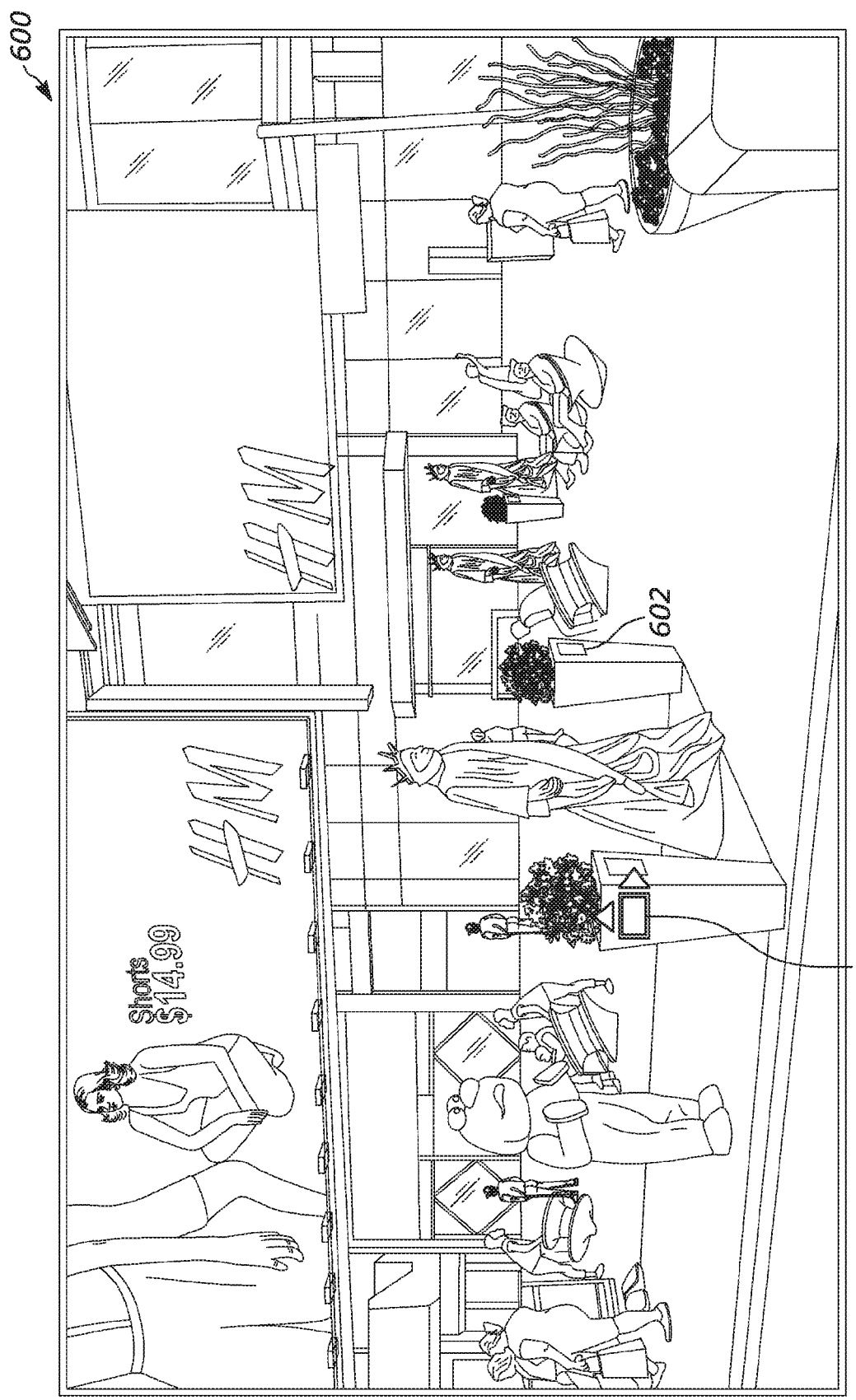
FIG. 6 depicts an object in foreground with available MR content enhancements and indications of possible directions wherein a user can pop-up the content enhancement in accordance with an embodiment.

Referring now to FIG. 6, the method is illustrated by a view 600 of a user including a visual cue that MR content enhancement is available for an object 602. The system has already determined potential directions for the content enhancement view pop-up, indicated by the arrowheads. The user may either gaze at one of the arrowheads, or use some other gesture known in the art, such as a combination of gaze and head/hand gestures to activate the content enhancement in either direction.

Figure 7:
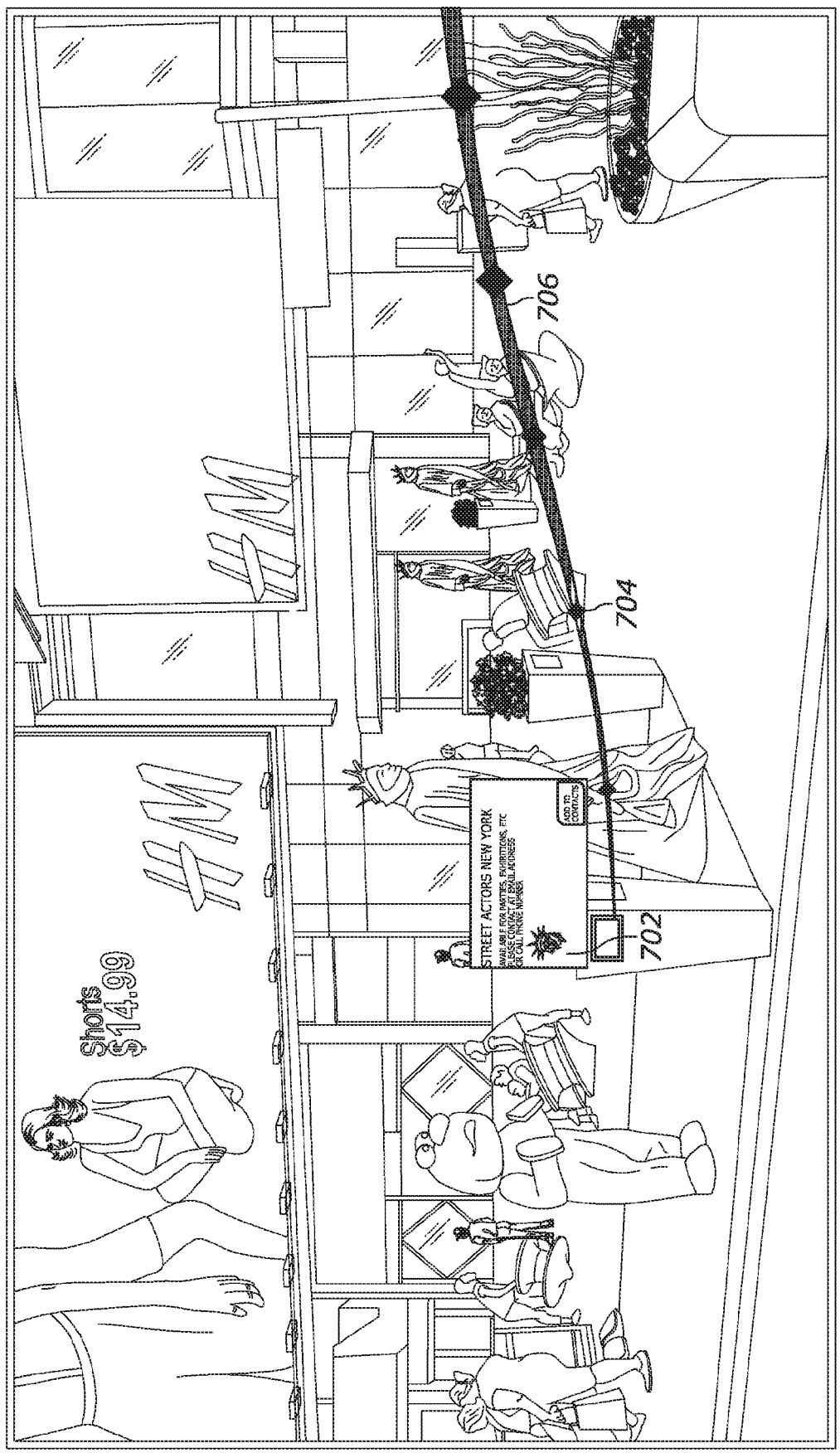
FIG. 7 depicts an activated content enhancement in accordance with an embodiment.

FIG. 7 illustrates a next stop in the method, specifically, a user activating an enhancement feature to the right. The enhanced content, a "calling card" 702, is shown, as well as the available focal points 704 and 706. To guide the user's actions, the next suggested action is highlighted with a focal point indicator. The enhanced content is shown at the farthest available focal point. The user can now move the enhanced content along the depth plane by looking at the different points 704 and 706 along the vision guideline. The next suggested action, which may be at a different depth and thus out of focus, is highlighted to give the user a peripheral vision cue of its location. In FIG. 7, the suggested action is to look at the next closer focal plane.

Figure 8:
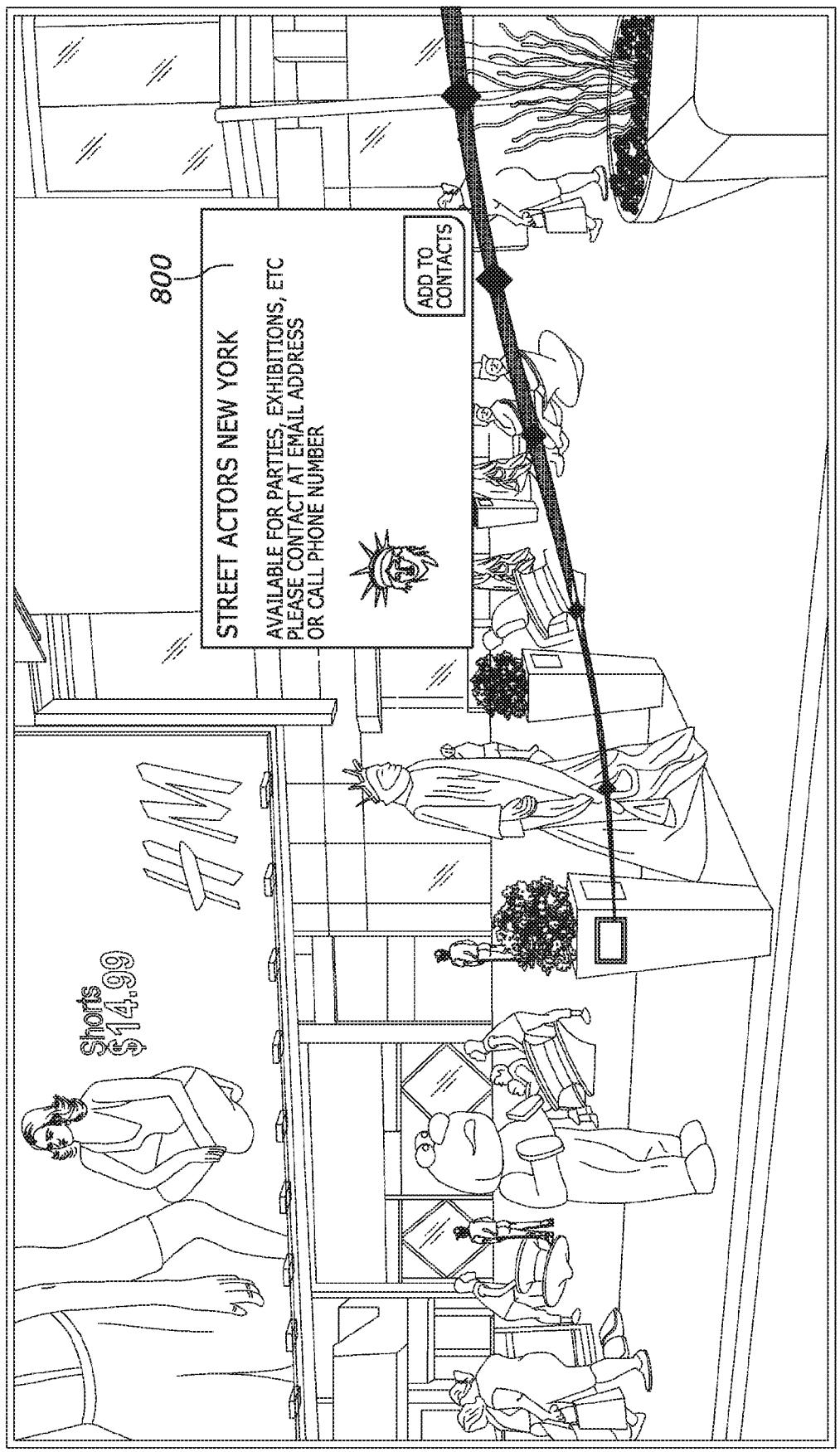
FIG. 8 depicts a user's drawing of content enhancement to the nearest focal point with his gaze in accordance with an embodiment.

FIG. 8 illustrates a user view after the user has drawn the enhancement object 800 to the closest focal point with a gaze. In an embodiment, a user can deactivate the enhanced content display 800 by turning his head, looking elsewhere after a short while has elapsed, or by moving the object back to starting point with his gaze.

Figure 9:
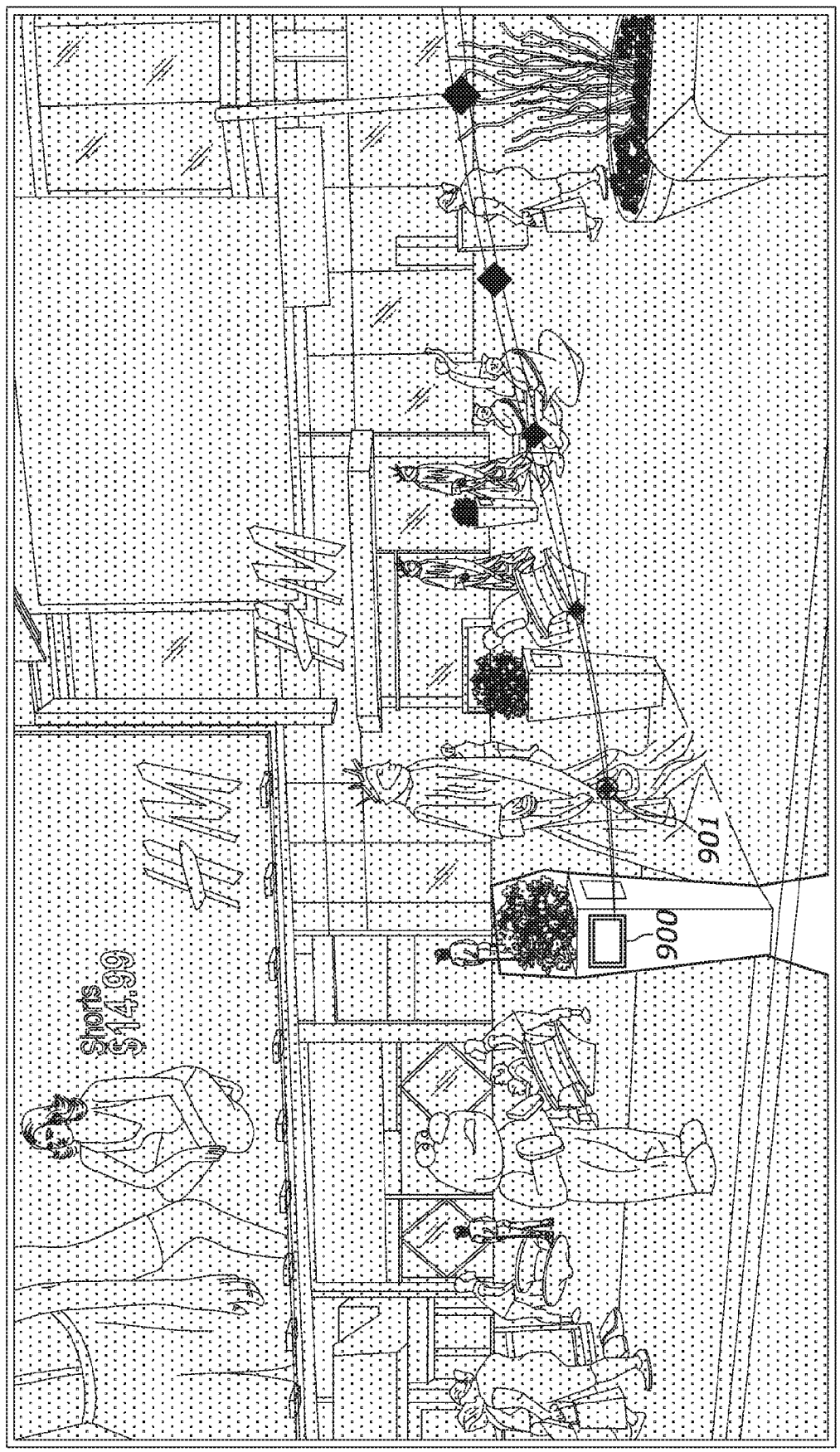
FIG. 9 depicts a view of a user focusing on an original object with a dot along a line indicating a next action in accordance with an embodiment.

Referring now to FIG. 9, in one embodiment, an enhancement object 900 is illustrated. In some embodiments, as a user focuses on a certain depth, other areas of a scene can be out of focus as shown by the dimming of the user view. Thus, the user benefits from seeing a change in peripheral vision, highlighting the next focal point 901.

Figure 10:
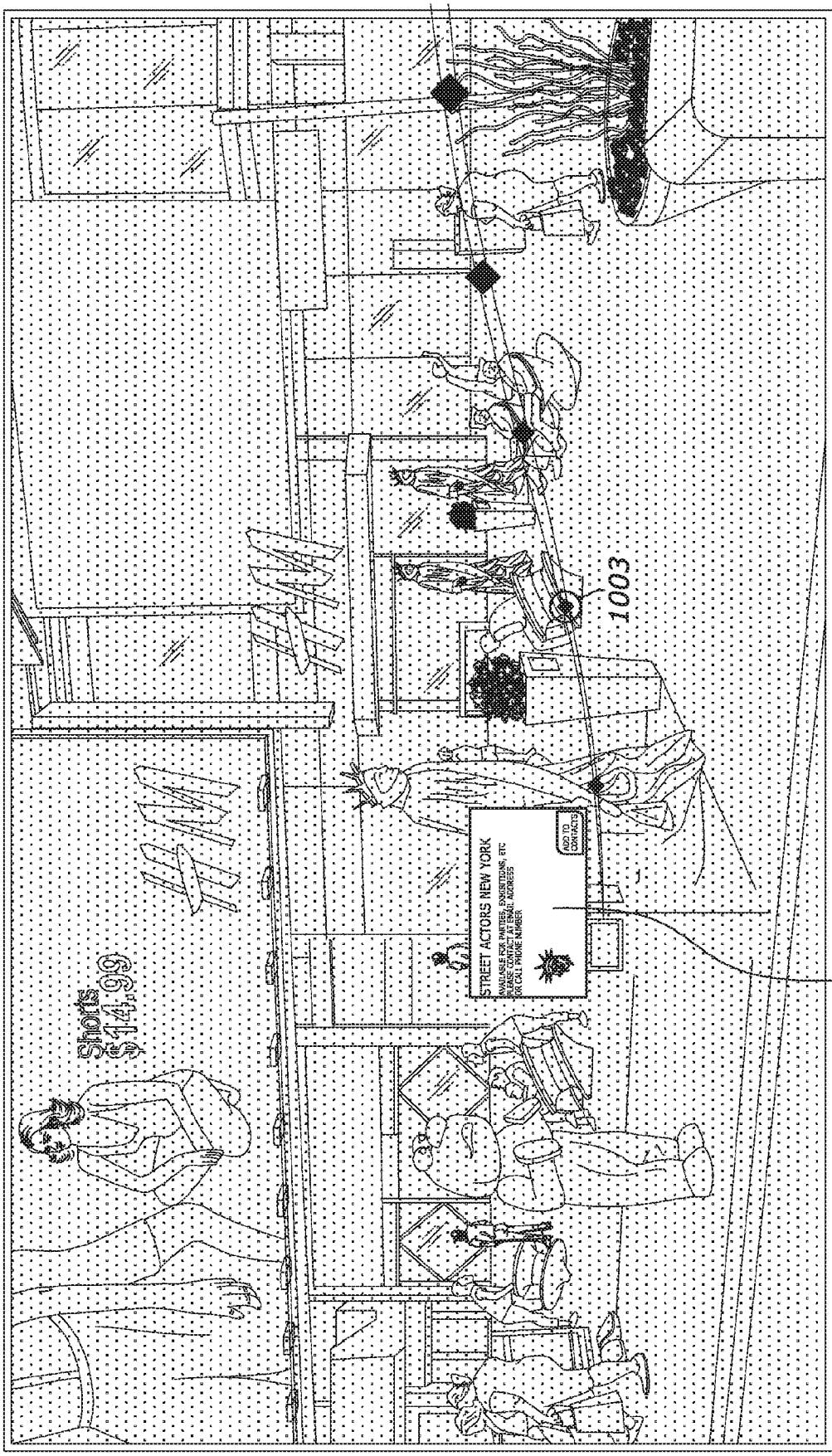
FIG. 10 depicts another view of a user focusing on an original object with a dot along a line indicating a next action in accordance with an embodiment.
Figure 11:
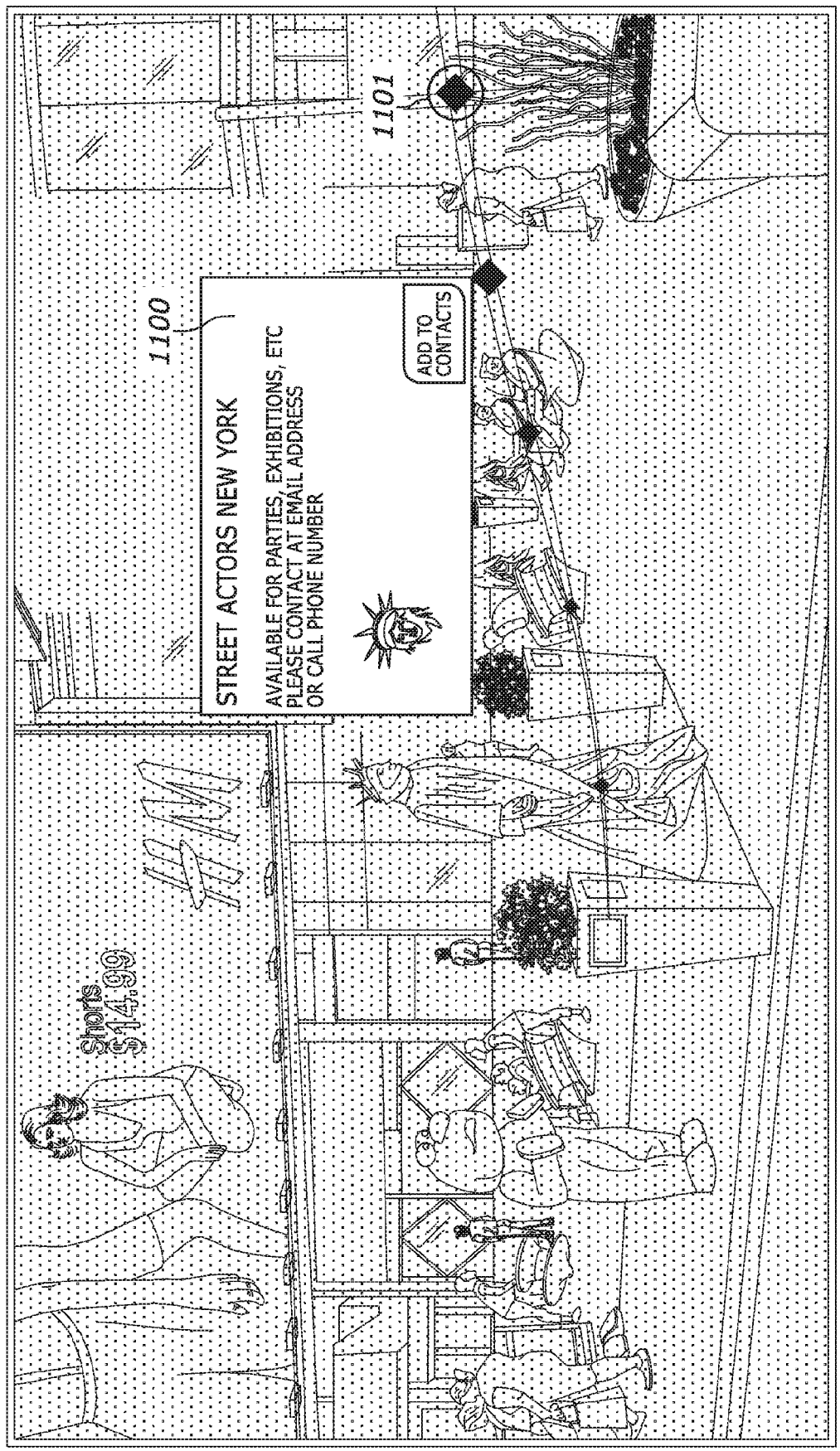
FIG. 11 depicts another view of a user focusing on an original object with an enlarged object in accordance with an embodiment.

Referring now to FIG. 10, further examples of a user view include a next action displaying a next action as a user focuses on enhancement object 1002. FIG. 10 illustrates that only an enhancement object 1002 may be in focus to assist a user in identifying where to look at next, such as focal point 1003. Thus, FIG. 10 demonstrates that as the user focuses on enhancement object 1002, he naturally cannot see the surroundings very clearly as they may be out of focus. However, by showing the suggested next action 1003 (next location to look at) clearly enough, a user should be able to identify the next action even if it is out of focus. FIG. 11 illustrates further eye movement from enhancement object 1100 to next action 1101.

Figure 12:
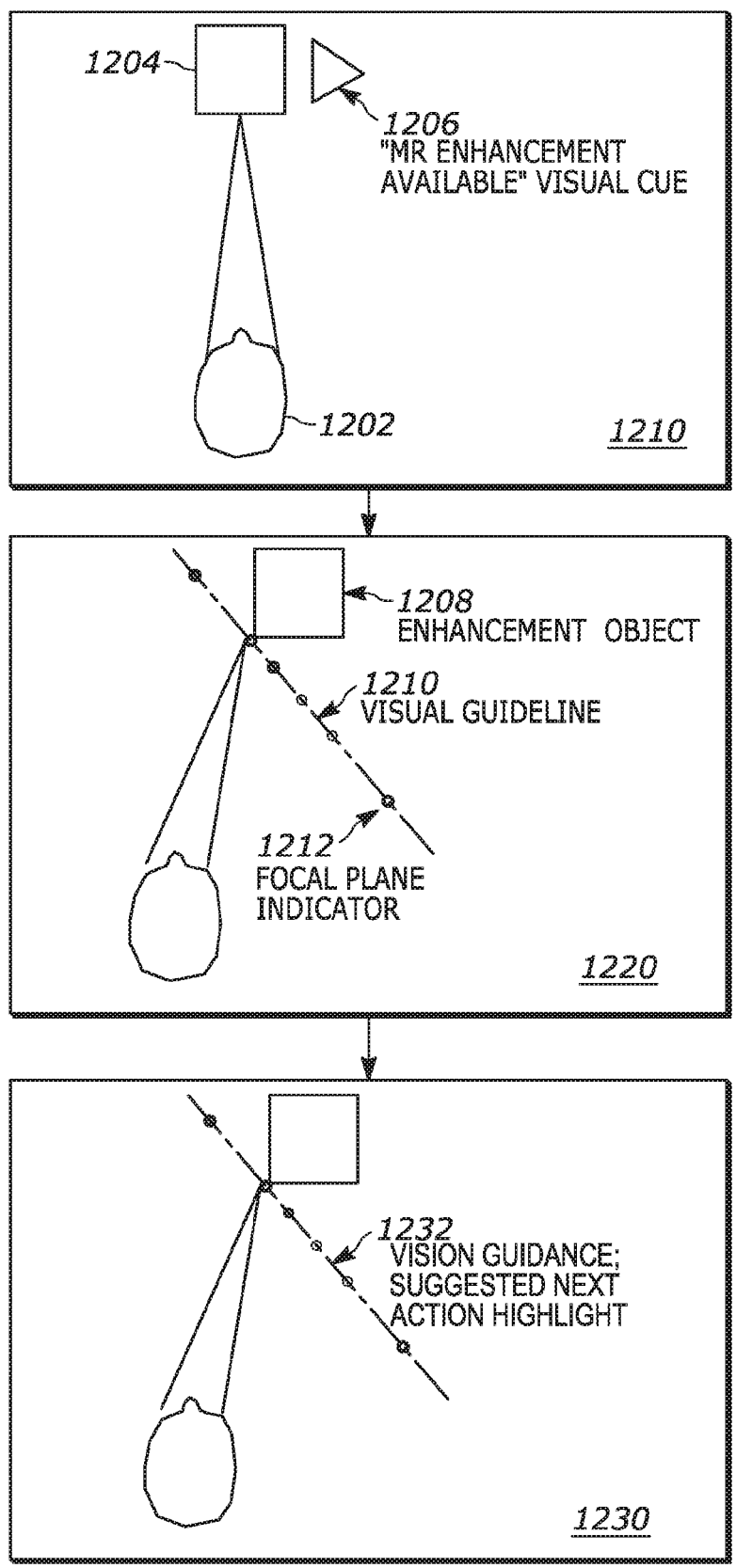
FIG. 12 depicts a method for activating a guiding an object in accordance with an embodiment.

Referring now to FIG. 12, activation and control steps are illustrated. As shown in block 1210, a real-life object 1204 or an existing MR object shows a visual cue 1206 that content enhancement (pop-up) is available for that object to user 1202. The user then activates in block 1220, the enhancement by, for example, a combination of gaze and head gesture, or gaze dwell on the cue. The enhancement object 1208 comes into view, along with the vision guideline 1210 that shows focal plane indicators 1212 at their corresponding depths. Then, in block 1230, as the user moves his gaze along the vision guideline 1232, the enhancement object moves correspondingly, effectively bringing the object closer for inspection. In blocks 1220 and 1230, FIG. 12 illustrates visual hints of a next suggested action including next focal plane indicators at different depths.

As shown, mixed reality enhancement available visual cue is presented to a user in block 1210. A gaze determines which object to enhance and available directions for enhancement can be determined automatically and shown with a visual cue. Next, in block 1220, activation occurs by a gaze dwell or other user input and a guideline with focal plane indicators along with an enhanced mixed reality object appears. Next, in block 1230, a suggested next action is highlighted with a gaze, such as a position control gaze and a next action may be highlighted.

Figure 13:
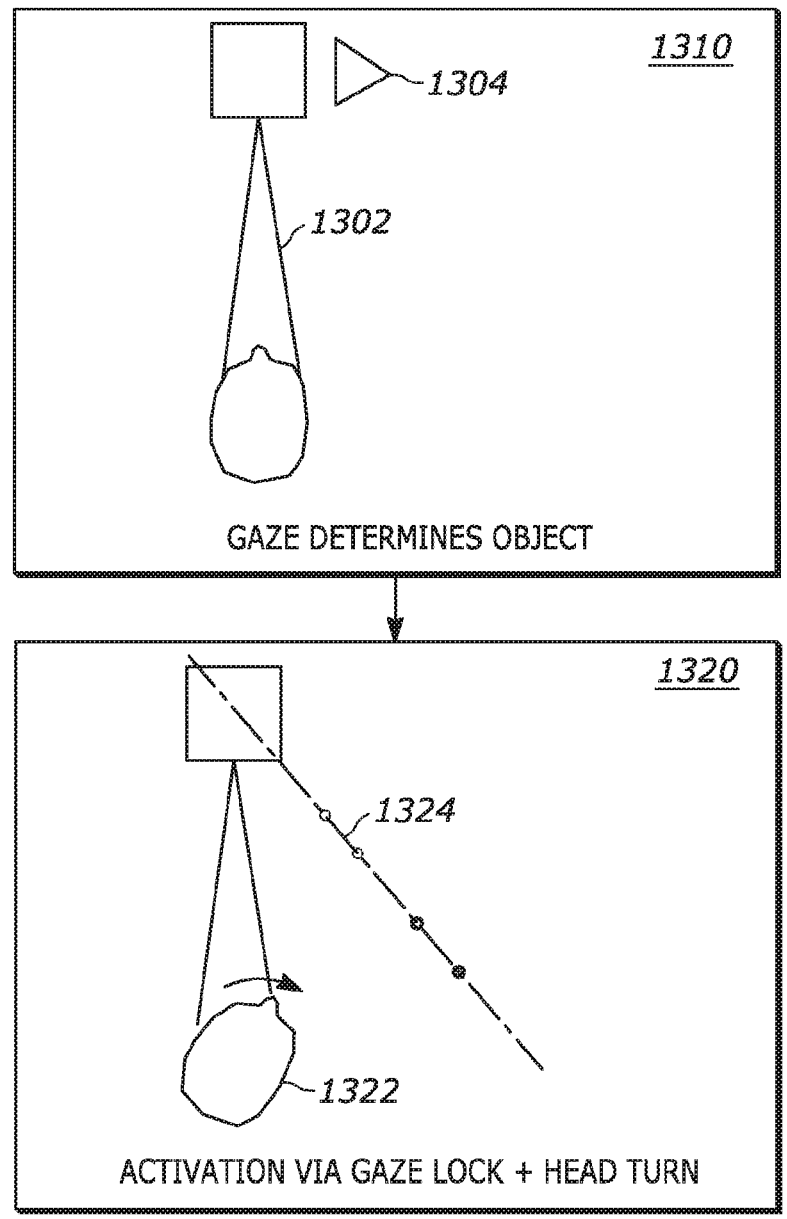
FIG. 13 shows schematic illustrations of two steps of a method for choosing and activating an object in accordance with an embodiment.

Referring now to FIG. 13, an alternative activation method illustrates that in 1310 a user can lock a gaze 1302 on the object to enhance, followed by, shown in 1320, the user turning his/her head 1322 in the direction of the direction cue 1304 which triggers the generation and display of guidance line 1324. Thus, activation occurs by a gaze lock and head turn. Furthermore, if multiple direction cues are available (see, for example the multiple directional cues 602 in FIG. 6), the direction of the users head turn may be used to select one of the multiple direction cues (e.g. the directional cue corresponding most closely to the direction of the users head turn).

Figure 14:
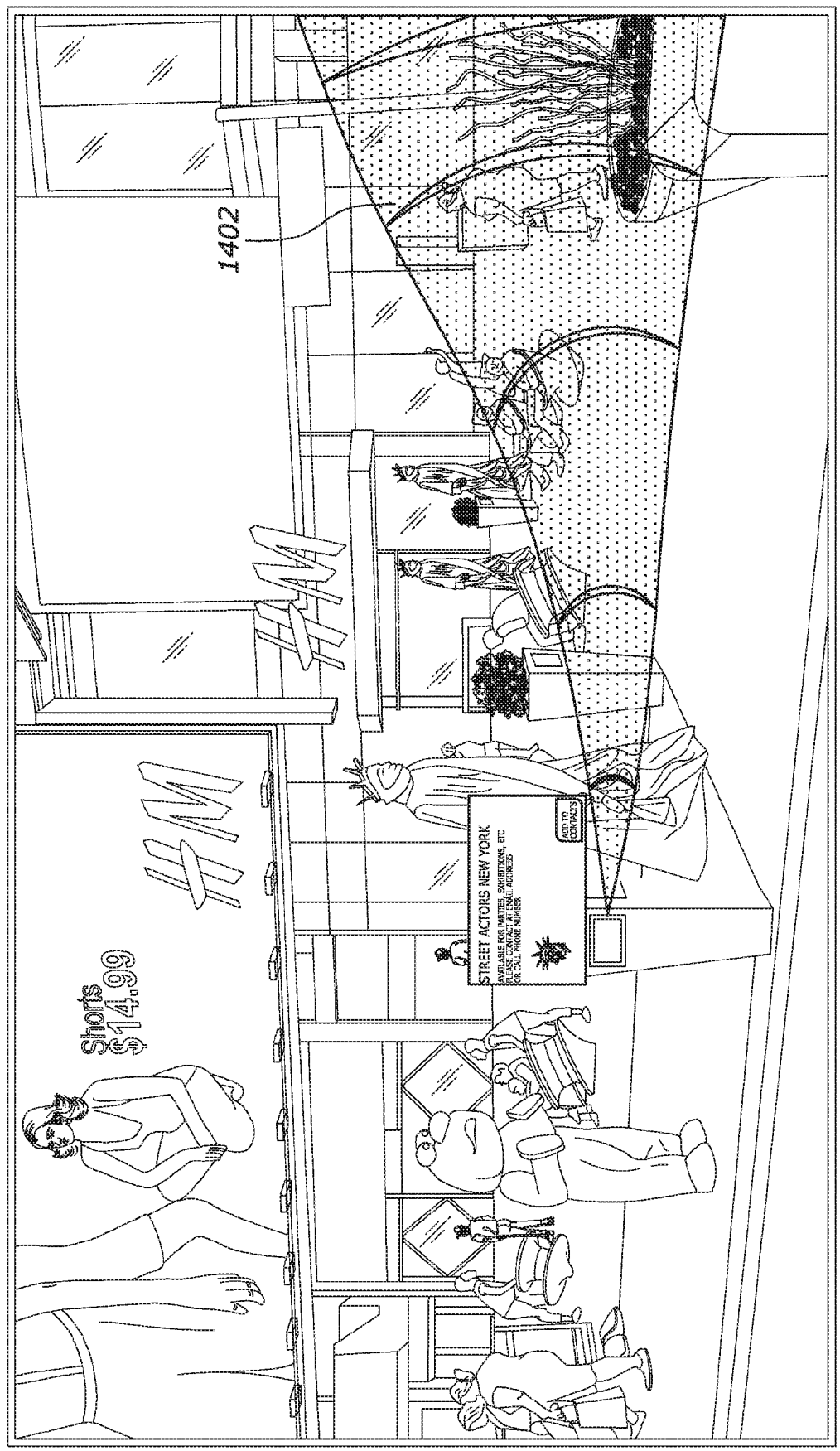
FIG. 14 depicts another view of a user focusing on an original object with an area highlighted along a visual guidance line pathway in accordance with an embodiment.

Referring now to FIG. 14, an example of a curved surface is shown. Instead of a line, the guidance helper could be displayed as a two-dimensional (2D) surface, such as the inner surface of a cone 1402 (plain, hyperbolic, tapered, . . . ), a series of concentric circles/triangles/rectangles, or the like.

According to an embodiment, providing a guidance helper enables a user to have a greater variety for controlling the position of the enhanced object with eyes only. In one embodiment, focally optimal depths can assist a user. Thus, a user has control over the vertical and horizontal positioning of the object. The area available for placing the enhancement object may be determined by a user with head movements, such as tilt, pitch and yaw. As shown, a user sees an area as if looking from inside of a cone 1402. Lines are drawn along the focally optimal distance. Also shown is a line that acts as a guide for a next suggested action.

Thus, a user could change the location of the vision guidance line after activation by, for example, head movement or by some other gesture, either freely or between available locations. For example, if the user activated the vision guidance line to his right, a large enough head tilt upwards would move the vision guidance line to another available location at the top of his field of view. With free movement, head pitch and yaw could move the guidance line up/down and left/right, respectively.

In one embodiment, the system and method provides a method for choosing the element to enhance, for example, if the number of potential objects is more than one or if there are objects in a distance.

Figure 15:
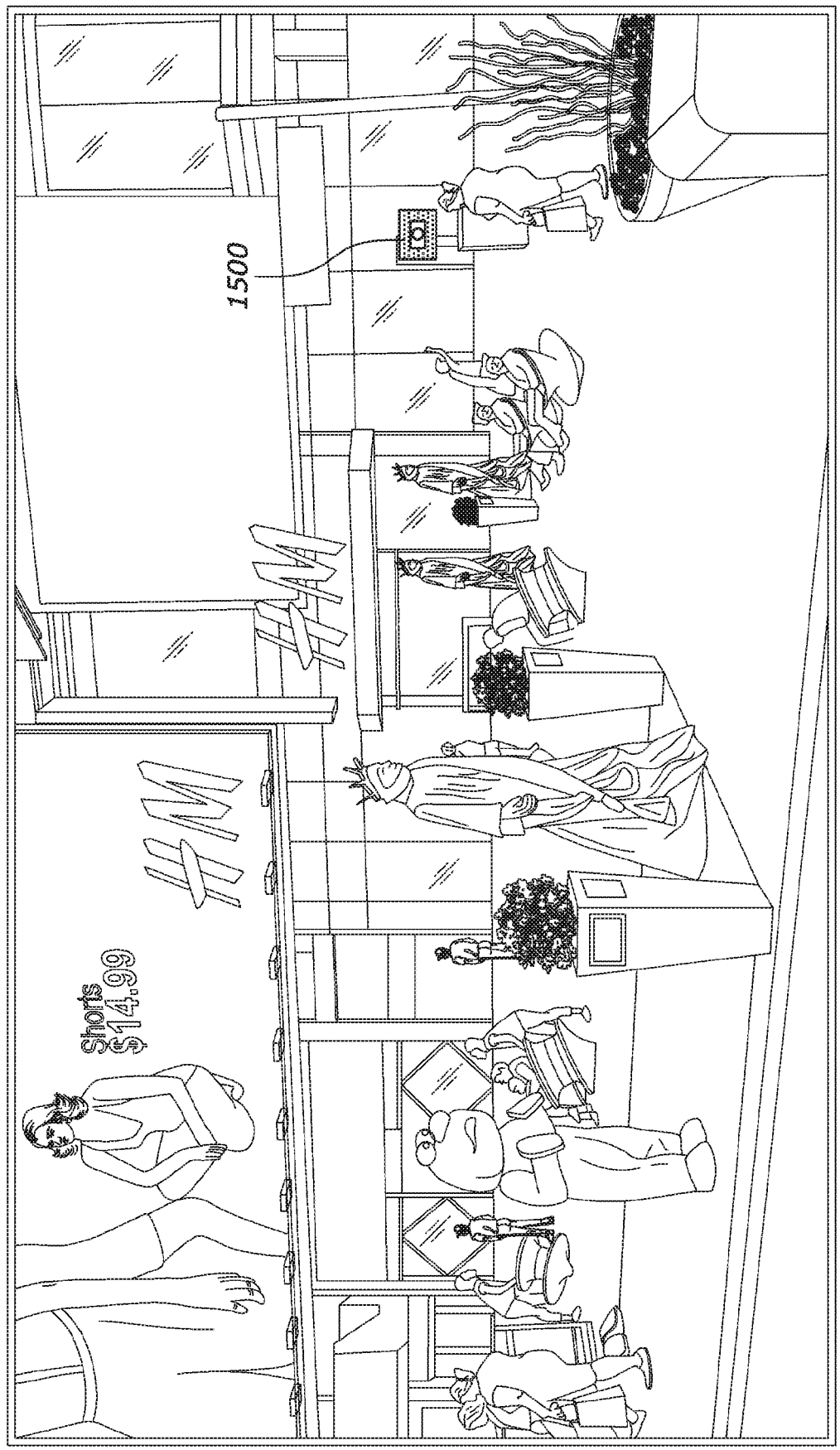
FIG. 15 depicts another view of a user in accordance with an embodiment

Referring to FIG. 15, potential enhancement objects are illustrated in a window 1500. A user can choose which object to activate by gazing or by other user input.

Figure 16:
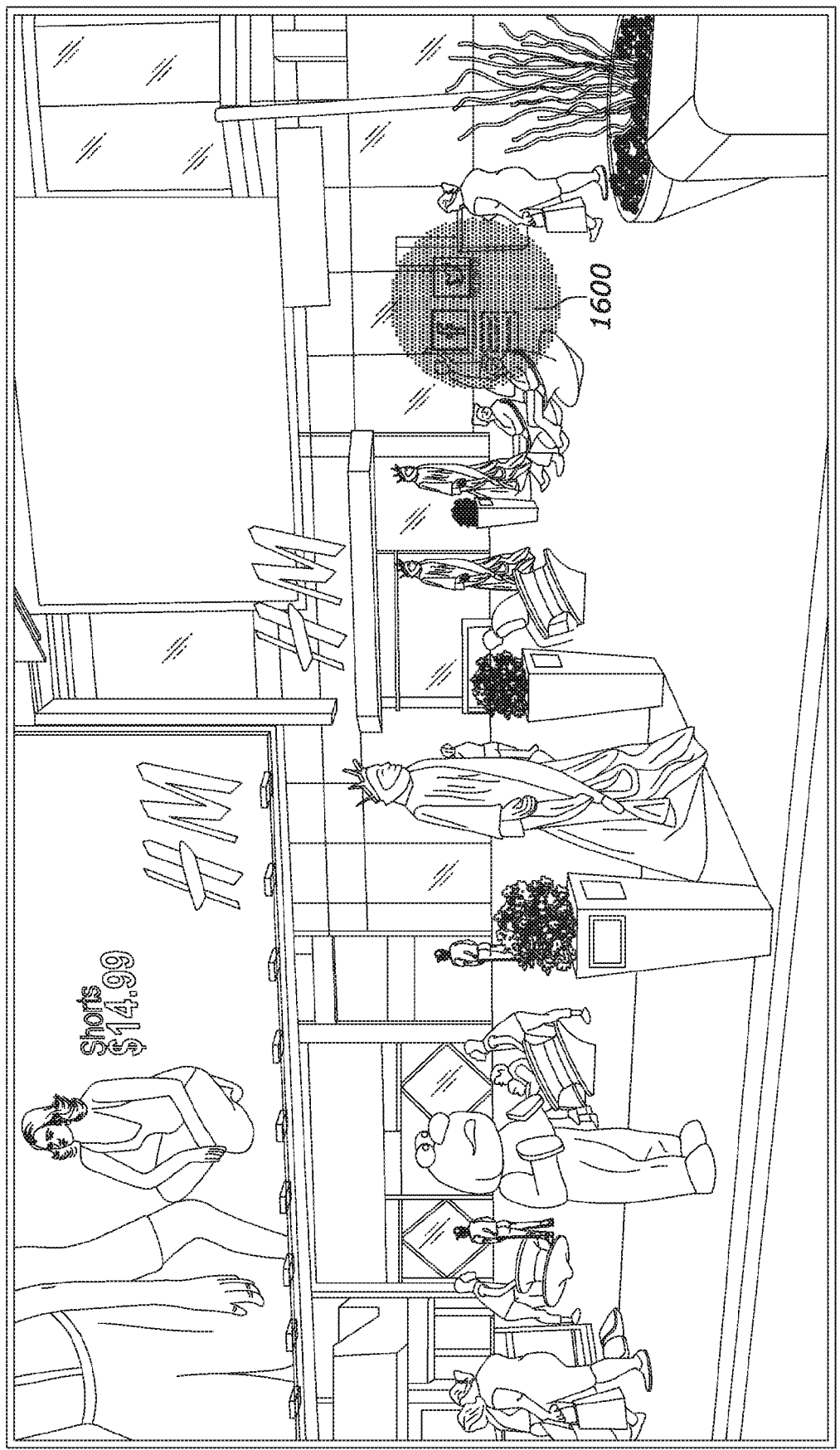
FIG. 16 depicts another view of a user focusing on an original object with a multiple objects shown in a distance in accordance with an embodiment.

FIG. 16 illustrates activating an object 1600 and bringing the object to a furthest focal plane.

Figure 17:
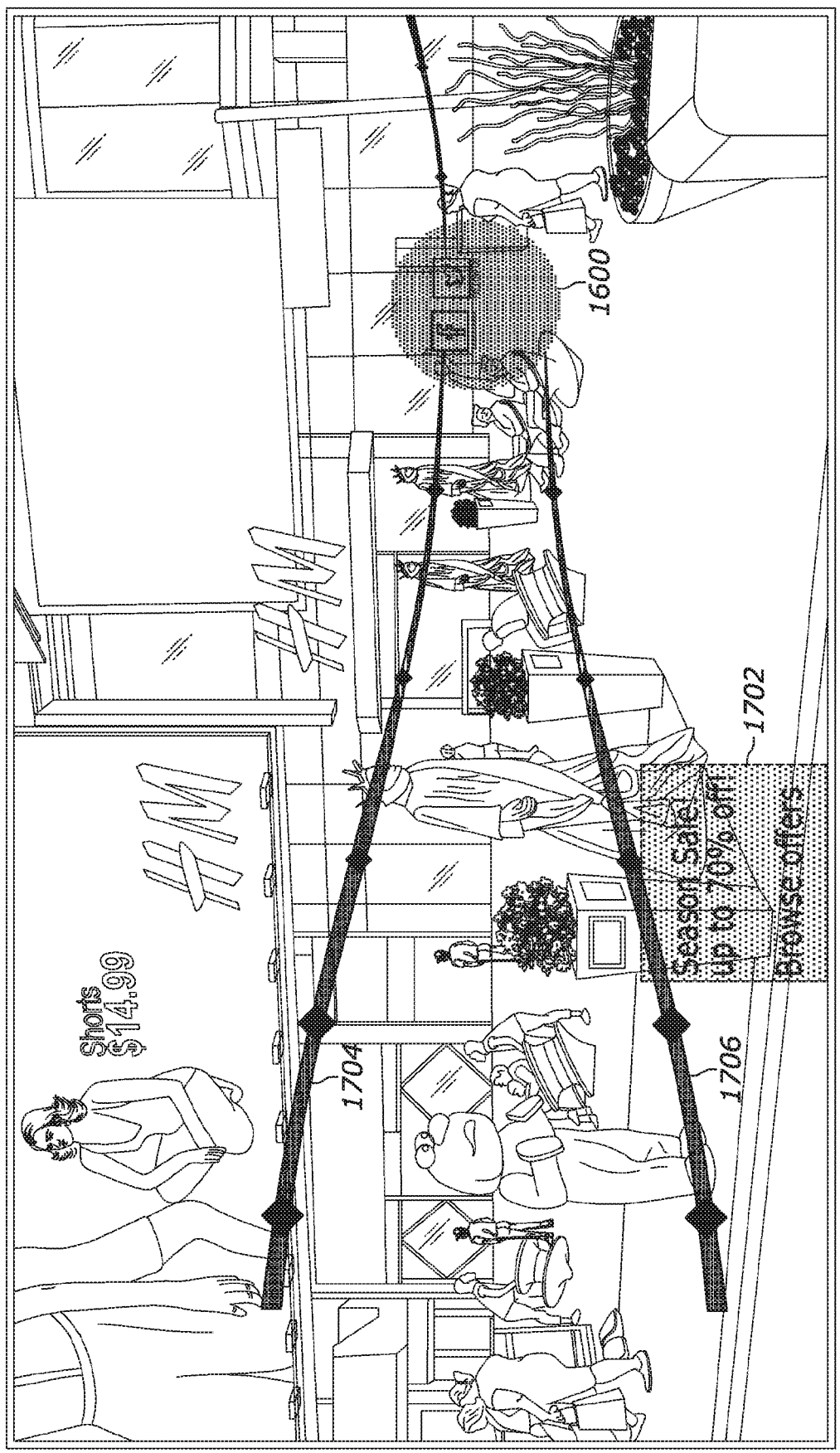
FIG. 17 depicts another view of a user focusing on an original object with a multiple visual guidance lines shown in accordance with an embodiment.

FIG. 17 illustrates a different vision guideline 1704 and 1706 for each object 1600. Thus, in one embodiment, a gaze draws an object 1702 nearer for closer examination.

Figure 18A:
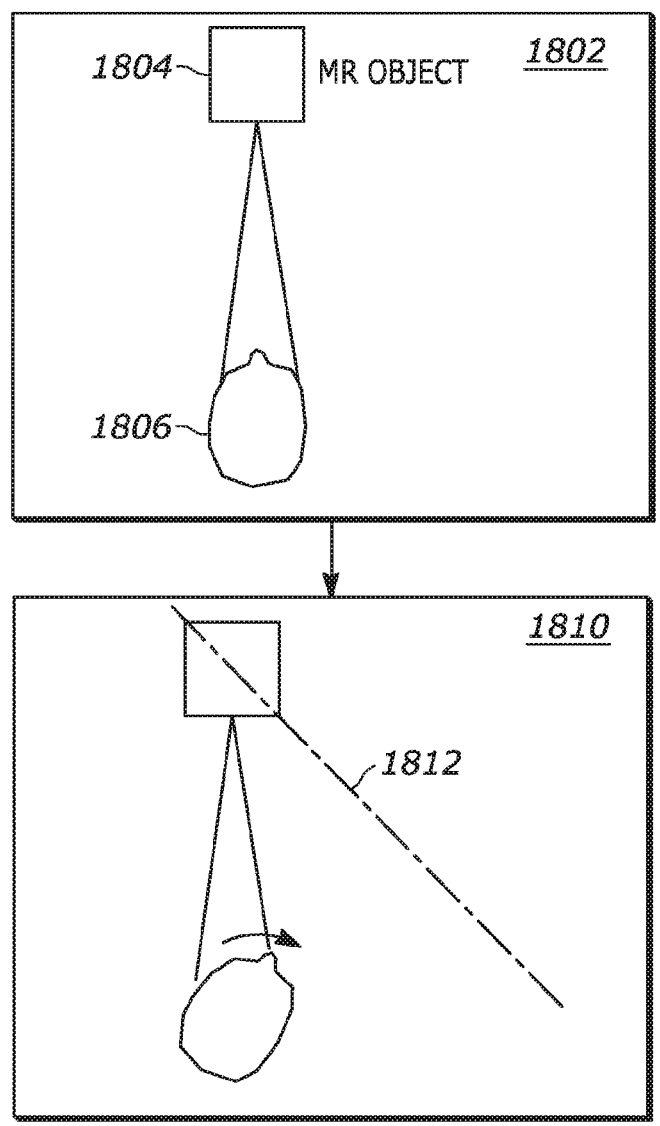
FIG. 18A depicts a method with schematic diagrams of a user changing the direction of a visual guidance line before the enhancement object starts to move along the visual guidance line in accordance with an embodiment.
Figure 18B:
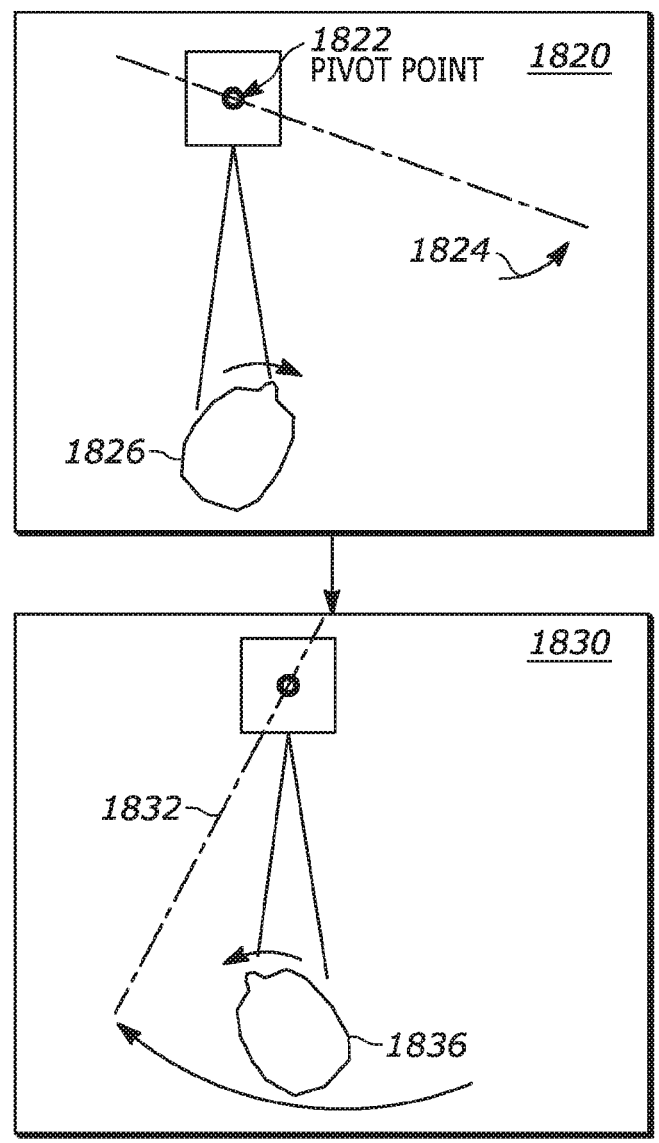
FIG. 18B depicts a method with schematic diagrams continuing the schematic diagrams of FIG. 18B further illustrating the changing of direction of the visual guidance line in accordance with an embodiment.

The user could also be allowed to freely change the direction of the guideline before the enhancement object starts to move along it, as illustrated in FIGS. 18A and 18B. Thus, in block 1802, a user 1806 gaze determines an object 1804. In block 1810, activation, a guideline 1812 appears. Referring to FIG. 18B, in block 1820, turning of a user head 1826 with a gaze fixed can turn the guideline 1824 along a pivot point 1822 that is either visible or invisible, either up or down or left to right, as shown in block 1830 with a user 1836 turning a gaze to the left and altering guideline 1832.

Thus a gaze and head gesture can modify the vision guidance line prior to activating a gaze-based depth control. In one embodiment, after activation, as long as the user maintains his gaze on the original object, head motions control the position of the vision guidance line. Then, after the line is where the user wants it, the line would be fixed in place by moving gaze from the original object onto some point along the line.

EXAMPLE NETWORKS FOR IMPLEMENTATION OF THE EMBODIMENTS

Figure 19A:
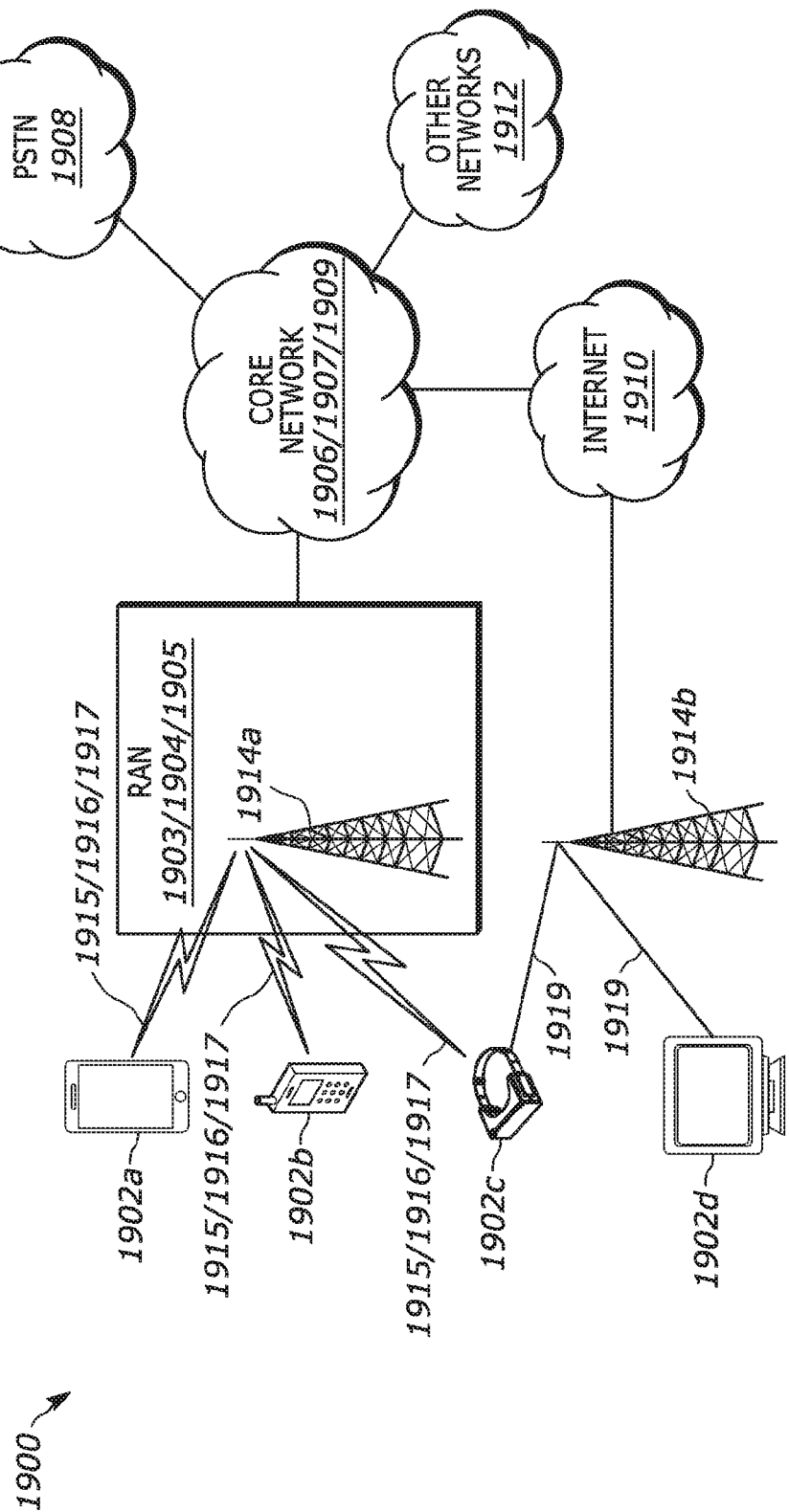
FIG. 19A is a system diagram illustrating an example communications system in which one or more disclosed embodiments may be implemented.

FIG. 19A is a diagram illustrating an example communications system 1900 in which one or more disclosed embodiments may be implemented. The communications system 1900 may be a multiple access system that provides content, such as voice, data, video, messaging, broadcast, etc., to multiple wireless users. The communications system 1900 may enable multiple wireless users to access such content through the sharing of system resources, including wireless bandwidth. For example, the communications systems 1900 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 19A, the communications system 1900 may include wireless transmit/receive units (WTRUs) 1902a, 1902b, 1902c, 1902d, a RAN 104/1913, a CN 106/1915, a public switched telephone network (PSTN) 1908, the Internet 1910, and other networks 1912, though it will be appreciated that the disclosed embodiments contemplate any number of WTRUs, base stations, networks, and/or network elements. Each of the WTRUs 1902a, 1902b, 1902c, 1902d may be any type of device configured to operate and/or communicate in a wireless environment. By way of example, the WTRUs 1902a, 1902b, 1902c, 10902d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 1902a, 1902b, 1902c and 1902d may be interchangeably referred to as a UE.

The communications systems 1900 may also include a base station 1914a and/or a base station 1914b. Each of the base stations 1914a, 1914b may be any type of device configured to wirelessly interface with at least one of the WTRUs 1902a, 1902b, 1902c, 1902d to facilitate access to one or more communication networks, such as the CN 1906/1915, the Internet 1910, and/or the other networks 1912. By way of example, the base stations 1914a, 1914b may be a base transceiver station (BTS), a Node-B, an eNode B, a Home Node B, a Home eNode B, a gNB, a NR NodeB, a site controller, an access point (AP), a wireless router, and the like. While the base stations 1914a, 1914b are each depicted as a single element, it will be appreciated that the base stations 1914a, 1914b may include any number of interconnected base stations and/or network elements.

The base station 1914a may be part of the RAN 1904/1913, which may also include other base stations and/or network elements (not shown), such as a base station controller (BSC), a radio network controller (RNC), relay nodes, etc. The base station 1914a and/or the base station 1914b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 1914a may be divided into three sectors. Thus, in one embodiment, the base station 1914a may include three transceivers, i.e., one for each sector of the cell. In an embodiment, the base station 1914a may employ multiple-input multiple output (MIMO) technology and may utilize multiple transceivers for each sector of the cell. For example, beamforming may be used to transmit and/or receive signals in desired spatial directions.

The base stations 1914*a*, 19914*b* may communicate with one or more of the WTRUs 1902*a*, 1902*b*, 1902*c*, 1902*d* over an air interface 1916, which may be any suitable wireless communication link (e.g., radio frequency (RF), microwave, centimeter wave, micrometer wave, infrared (IR), ultraviolet (UV), visible light, etc.). The air interface 1916 may be established using any suitable radio access technology (RAT).

More specifically, as noted above, the communications system 1900 may be a multiple access system and may employ one or more channel access schemes, such as CDMA, TDMA, FDMA, OFDMA, SC-FDMA, and the like. For example, the base station 1914*a* in the RAN 1904/1913 and the WTRUs 1902*a*, 1902*b*, 1902*c* may implement a radio technology such as Universal Mobile Telecommunications System (UMTS) Terrestrial Radio Access (UTRA), which may establish the air interface 1915/1916/1917 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 1914*a* and the WTRUs 1902*a*, 1902*b*, 1902*c* may implement a radio technology such as Evolved UMTS Terrestrial Radio Access (E-UTRA), which may establish the air interface 1916 using Long Term Evolution (LTE) and/or LTE-Advanced (LTE-A) and/or LTE-Advanced Pro (LTE-A Pro).

In an embodiment, the base station 1914*a* and the WTRUs 1902*a*, 1902*b*, 1902*c* may implement a radio technology such as NR Radio Access, which may establish the air interface 1916 using New Radio (NR).

In an embodiment, the base station 1914*a* and the WTRUs 1902*a*, 1902*b*, 1902*c* may implement multiple radio access technologies. For example, the base station 1914*a* and the WTRUs 1902*a*, 1902*b*, 1902*c* may implement LTE radio access and NR radio access together, for instance using dual connectivity (DC) principles. Thus, the air interface utilized by WTRUs 1902*a*, 1902*b*, 1902*c* may be characterized by multiple types of radio access technologies and/or transmissions sent to/from multiple types of base stations (e.g., a eNB and a gNB).

In other embodiments, the base station 1914*a* and the WTRUs 1902*a*, 1902*b*, 1902*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 1914*b* in FIG. 19A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 1914*b* and the WTRUs 1902*c*, 1902*d* may implement a radio technology such as IEEE 802.11 to establish a wireless local area network (WLAN). In an embodiment, the base station 1914*b* and the WTRUs 1902*c*, 1902*d* may implement a radio technology such as IEEE 802.15 to establish a wireless personal area network (WPAN). In yet another embodiment, the base station 1914*b* and the WTRUs 1902*c*, 1902*d* may utilize a cellular-based RAT (e.g., WCDMA, CDMA2000, GSM, LTE, LTE-A, LTE-A Pro, NR etc.) to establish a picocell or femtocell. As shown in FIG. 19A, the base station 1914*b* may have a direct connection to the Internet 1910. Thus, the base station 1914*b* may not be required to access the Internet 1910 via the CN 1906/1915.

The RAN 1904/1913 may be in communication with the CN 1906/1915, which may be any type of network configured to provide voice, data, applications, and/or voice over internet protocol (VoIP) services to one or more of the WTRUs 1902*a*, 1902*b*, 1902*c*, 1902*d*. The data may have varying quality of service (QoS) requirements, such as differing throughput requirements, latency requirements, error tolerance requirements, reliability requirements, data throughput requirements, mobility requirements, and the like. The CN 1906/1915 may provide call control, billing services, mobile location-based services, pre-paid calling, Internet connectivity, video distribution, etc., and/or perform high-level security functions, such as user authentication. Although not shown in FIG. 19A, it will be appreciated that the RAN 1904/1913 and/or the CN 1906/1915 may be in direct or indirect communication with other RANs that employ the same RAT as the RAN 1904/1913 or a different RAT. For example, in addition to being connected to the RAN 1904/1913, which may be utilizing a NR radio technology, the CN 1906/1915 may also be in communication with another RAN (not shown) employing a GSM, UMTS, CDMA 2000, WiMAX, E-UTRA, or WiFi radio technology.

The CN 1906/1915 may also serve as a gateway for the WTRUs 1902*a*, 1902*b*, 1902*c*, 1902*d* to access the PSTN 1908, the Internet 1910, and/or the other networks 1912. The PSTN 1908 may include circuit-switched telephone networks that provide plain old telephone service (POTS). The Internet 1910 may include a global system of interconnected computer networks and devices that use common communication protocols, such as the transmission control protocol (TCP), user datagram protocol (UDP) and/or the internet protocol (IP) in the TCP/IP internet protocol suite. The networks 1912 may include wired and/or wireless communications networks owned and/or operated by other service providers. For example, the networks 1912 may include another CN connected to one or more RANs, which may employ the same RAT as the RAN 1904/1913 or a different RAT.

Some or all of the WTRUs 1902*a*, 1902*b*, 1902*c*, 1902*d* in the communications system 1900 may include multi-mode capabilities (e.g., the WTRUs 1902*a*, 1902*b*, 1902*c*, 1902*d* may include multiple transceivers for communicating with different wireless networks over different wireless links). For example, the WTRU 1902*c* shown in FIG. 19A may be configured to communicate with the base station 19914*a*, which may employ a cellular-based radio technology, and with the base station 1914*b*, which may employ an IEEE 802 radio technology.

Figure 19B:
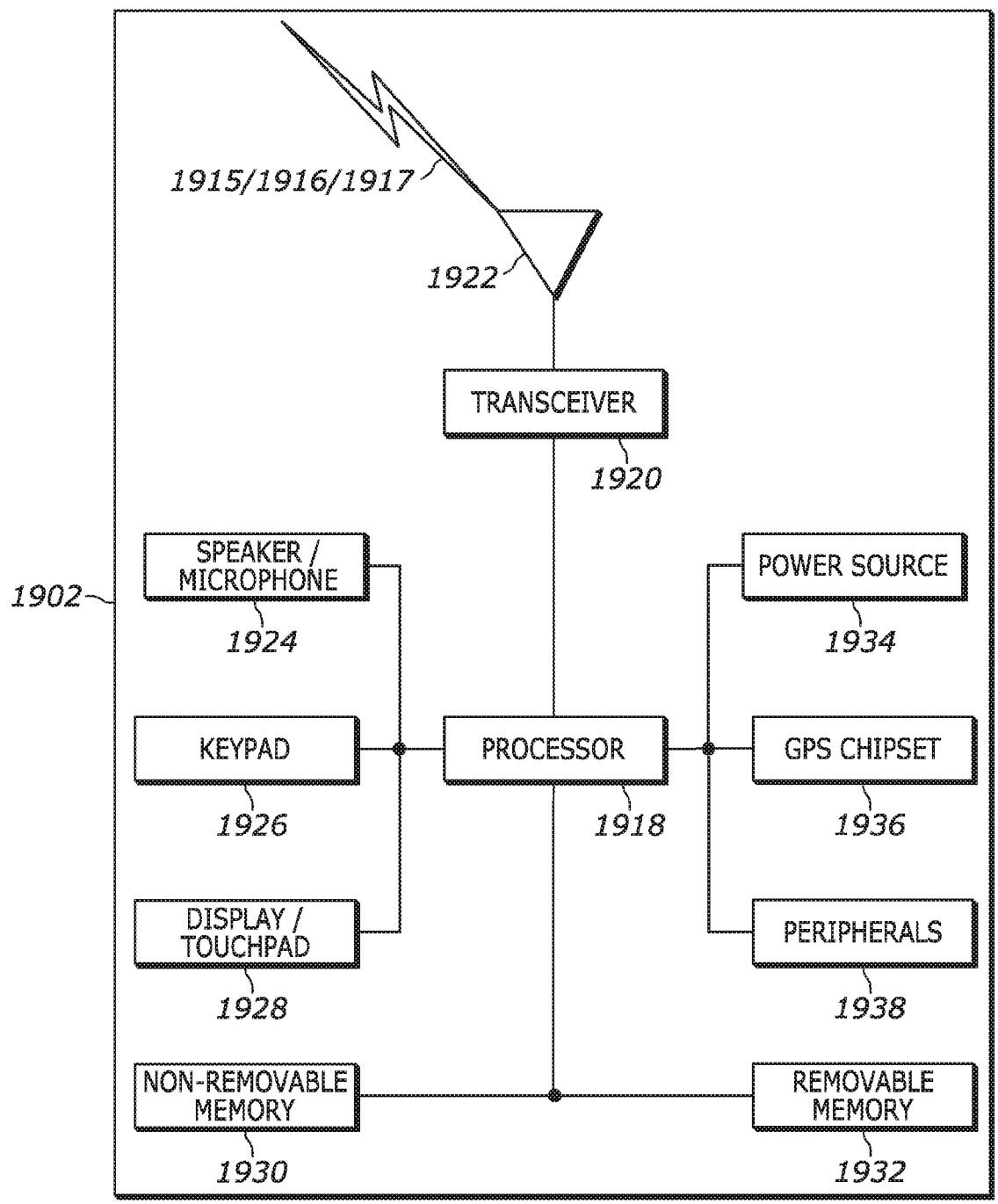
FIG. 19B is a system diagram illustrating an example wireless transmit/receive unit (WTRU) that may be used within the communications system illustrated in FIG. 19A according to an embodiment.

FIG. 19B is a system diagram illustrating an example WTRU 1902. As shown in FIG. 19B, the WTRU 1902 may include a processor 1918, a transceiver 1920, a transmit/receive element 1922, a speaker/microphone 1924, a keypad 1926, a display/touchpad 1928, non-removable memory 1930, removable memory 1932, a power source 1934, a global positioning system (GPS) chipset 1936, and/or other peripherals 1938, among others. It will be appreciated that the WTRU 1902 may include any sub-combination of the foregoing elements while remaining consistent with an embodiment.

The processor 1918 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 1918 may perform signal coding, data processing, power control, input/output processing, and/or any other functionality that enables the WTRU 1902 to operate in a wireless environment. The processor 1918 may be coupled to the transceiver 1920, which may be coupled to the transmit/receive element 1922. While FIG. 19B depicts the processor 1918 and the transceiver 1920 as separate components, it will be appreciated that the processor 1918 and the transceiver 1920 may be integrated together in an electronic package or chip.

The transmit/receive element 1922 may be configured to transmit signals to, or receive signals from, a base station (e.g., the base station 1914a) over the air interface 1916. For example, in one embodiment, the transmit/receive element 1922 may be an antenna configured to transmit and/or receive RF signals. In an embodiment, the transmit/receive element 1922 may be an emitter/detector configured to transmit and/or receive IR, UV, or visible light signals, for example. In yet another embodiment, the transmit/receive element 1922 may be configured to transmit and/or receive both RF and light signals. It will be appreciated that the transmit/receive element 1922 may be configured to transmit and/or receive any combination of wireless signals.

Although the transmit/receive element 1922 is depicted in FIG. 19B as a single element, the WTRU 1902 may include any number of transmit/receive elements 1922. More specifically, the WTRU 1902 may employ MIMO technology. Thus, in one embodiment, the WTRU 1902 may include two or more transmit/receive elements 1922 (e.g., multiple antennas) for transmitting and receiving wireless signals over the air interface 1916.

The transceiver 1920 may be configured to modulate the signals that are to be transmitted by the transmit/receive element 1922 and to demodulate the signals that are received by the transmit/receive element 1922. As noted above, the WTRU 1902 may have multi-mode capabilities. Thus, the transceiver 1920 may include multiple transceivers for enabling the WTRU 1902 to communicate via multiple RATs, such as NR and IEEE 802.11, for example.

The processor 1918 of the WTRU 1902 may be coupled to, and may receive user input data from, the speaker/microphone 1924, the keypad 1926, and/or the display/touchpad 1928 (e.g., a liquid crystal display (LCD) display unit or organic light-emitting diode (OLED) display unit). The processor 1918 may also output user data to the speaker/microphone 1924, the keypad 1926, and/or the display/touchpad 1928. In addition, the processor 1918 may access information from, and store data in, any type of suitable memory, such as the non-removable memory 1930 and/or the removable memory 1932. The non-removable memory 1930 may include random-access memory (RAM), read-only memory (ROM), a hard disk, or any other type of memory storage device. The removable memory 1932 may include a subscriber identity module (SIM) card, a memory stick, a secure digital (SD) memory card, and the like. In other embodiments, the processor 1918 may access information from, and store data in, memory that is not physically located on the WTRU 1902, such as on a server or a home computer (not shown).

The processor 1918 may receive power from the power source 1934, and may be configured to distribute and/or control the power to the other components in the WTRU 1902. The power source 1934 may be any suitable device for powering the WTRU 1902. For example, the power source 1934 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 1918 may also be coupled to the GPS chipset 1936, which may be configured to provide location information (e.g., longitude and latitude) regarding the current location of the WTRU 1902. In addition to, or in lieu of, the information from the GPS chipset 1936, the WTRU 102 may receive location information over the air interface 1916 from a base station (e.g., base stations 1914a, 1914b) and/or determine its location based on the timing of the signals being received from two or more nearby base stations. It will be appreciated that the WTRU 1902 may acquire location information by way of any suitable location-determination method while remaining consistent with an embodiment.

The processor 1918 may further be coupled to other peripherals 1938, which may include one or more software and/or hardware modules that provide additional features, functionality and/or wired or wireless connectivity. For example, the peripherals 1938 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 1938 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 1902 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 1918). In an embodiment, the WRTU 1902 may include a half-duplex radio for which transmission and reception of some or all of the signals (e.g., associated with particular subframes for either the UL (e.g., for transmission) or the downlink (e.g., for reception)).

As described above, systems and methods set forth herein provide embodiments that use gaze control to bring enhanced MR content pertaining to faraway objects closer to the user. The solution uses a vision guideline implemented as an MR object. The guideline contains points that help the user to focus his gaze, placed at depths equivalent to the focally correct viewing distances supported by device hardware. The enhanced MR content follows the users gaze along the line, thus moving the content closer or farther from the user. The location and dimensions of the line are determined by the system, based on HW restrictions and existing real-life or MR objects in the user's view.

In accordance with an embodiment, a method includes forming a three-dimensional (3D) map of surroundings of a user of an augmented reality (AR) head mounted display (HMD); determining a depth-wise location of a gaze point of a user based on eye gaze direction and eye vergence; determining a visual guidance line pathway in the 3D map; guiding an action of the user along the visual guidance line pathway at one or more identified focal points; and rendering a mixed reality (MR) object along the visual guidance line pathway at a location corresponding to a direction of the users gaze.

In one embodiment, the one or more focal points along the visual guidance line pathway are determined by gaze tracking of the user.

In one embodiment, the one or more focal points along the visual guidance line pathway are determined according to one or more hardware restrictions of the HMD.

In one or more embodiments, the one or more focal points along the visual guidance line pathway are determined based on a number of visually correct focal planes displayable by the HMD.

In one or more embodiments, the one or more focal points along the visual guidance line pathway are determined based on a determined accuracy of gaze tracking available on the HMD.

In one or more embodiments, the one or more focal points along the visual guidance line pathway are determined based on a number of visually correct focal planes displayable by the HMD.

In one or more embodiments, the one or more focal points along the visual guidance line pathway are determined based on a determined accuracy of gaze tracking available on the HMD.

In one embodiment, the one or more focal points along the visual guidance line pathway are determined according to a distance of the MR object.

In one embodiment, the one or more focal points along the visual guidance line pathway are determined by a movement of the user.

In one embodiment, the determining the visual guidance line pathway in the 3D map is based on the depth-wise location of the gaze point of the user and available space in the 3D map. In one embodiment, the determining the visual guidance line pathway in the 3D map includes forming the visual guidance line pathway to avoid one or more identified objects in the 3D map.

In one embodiment, the determining the visual guidance line pathway in the 3D map includes altering the visual guidance line pathway according to movements of the user, including one or more of a head tilt, a head pitch, a head yaw, and a gesture.

In one embodiment, the determining the visual guidance line pathway in the 3D map includes altering the visual guidance line pathway according to one or more pivot points determined by a user gaze.

In one embodiment, the method also includes determining a number of points along the visual guidance line pathway as a function of available focal planes in the 3D map.

Another embodiment is directed to a method including forming a three-dimensional (3D) map of surroundings of a user of an augmented reality (AR) head mounted display (HMD); displaying a mixed reality (MR) object in the 3D map including a visual cue that content enhancement is available to the user for the object; activating the content enhancement according to user input to the HMD with respect to the visual cue; displaying a visual guidance line pathway in the 3D map; guiding an action of the user along the visual guidance line pathway at one or more identified focal points; and rendering the MR object along the visual guidance line pathway at a location corresponding to a direction of the user's gaze.

In one or more embodiments, the activating the content enhancement according to user input to the HMD includes user input of one or more of a gaze, a head gesture, or a gaze dwelling on the content enhancement.

In one or more embodiments, the displaying the visual guidance line pathway in the 3D map includes displaying the one or more identified focal points as a plurality of focal plane indicators at a plurality of depths within the 3D map.

In one or more embodiments, the rendering the MR object along the visual guidance line pathway at the location corresponding to the direction of the users gaze includes moving the enhancement object along the plurality of focal plane indicators at the plurality of depths to enlarge the MR object.

In one or more embodiments, the guiding the action of the user along the visual guidance line pathway at the one or more identified focal points includes providing the visual cue, wherein the visual cue includes a next suggested action for the user.

In one or more embodiments, the displaying the visual guidance line pathway in the 3D map includes determining a depth-wise location of a gaze point of a user based on eye gaze direction and eye vergence.

Another embodiment is directed to a system including a processor and a non-transitory computer-readable storage medium storing instructions operative, when executed on the processor, to perform functions including forming a three-dimensional (3D) map of surroundings of a user of an augmented reality (AR) head mounted display (HMD); determining a depth-wise location of a gaze point of a user based on eye gaze direction and eye vergence; determining a visual guidance line pathway in the 3D map; guiding an action of the user along the visual guidance line pathway at one or more identified focal points; and rendering a mixed reality (MR) object along the visual guidance line pathway at a location corresponding to a direction of the user's gaze.

In one or more embodiments of the system, the one or more focal points along the visual guidance line pathway are determined by gaze tracking of a user.

In one or more embodiments of the system, the one or more focal points along the visual guidance line pathway are determined according to one or more hardware restrictions of the HMD.

In one or more embodiments of the system, the one or more focal points along the visual guidance line pathway are determined according to a distance of the MR object.

In one or more embodiments of the system, the one or more focal points along the visual guidance line pathway are determined by a movement of the user.

In one or more embodiments of the system, the determining the visual guidance line pathway in the 3D map is based on the depth-wise location of the gaze point of the user and available space in the 3D map.

In one or more embodiments of the system, the determining the visual guidance line pathway in the 3D map includes forming the visual guidance line pathway to avoid one or more identified objects in the 3D map. In one or more embodiments of the system, the determining the visual guidance line pathway in the 3D map includes altering the visual guidance line pathway according to movements of the user, including one or more of a head tilt, a head pitch, a head yaw, and a gesture.

In one or more embodiments of the system, the determining the visual guidance line pathway in the 3D map includes altering the visual guidance line pathway according to pivot points determined by user gaze.

Another embodiment of the system is directed to the non-transitory computer-readable storage medium storing instructions operative, when executed on the processor, to perform additional functions including determining a number of points along the visual guidance line pathway as a function of available focal planes in the 3D map.

Another embodiment is directed to a system including a processor and a non-transitory computer-readable storage medium storing instructions operative, when executed on the processor, to perform functions including forming a three-dimensional (3D) map of surroundings of a user of an augmented reality (AR) head mounted display (HMD); displaying a mixed reality (MR) object in the 3D map including a visual cue that content enhancement is available to the user for the object; activating the content enhancement according to user input to the HMD with respect to the visual cue; displaying a visual guidance line pathway in the 3D map; guiding an action of the user along the visual guidance line pathway at one or more identified focal points; and rendering the MR object along the visual guidance line pathway at a location corresponding to a direction of the user's gaze.

In one or more embodiments of the system, the activating the content enhancement according to user input to the HMD includes user input of one or more of a gaze, a head gesture, or a gaze dwelling on the content enhancement.

In one or more embodiments of the system, the displaying the visual guidance line pathway in the 3D map includes displaying the one or more identified focal points as a plurality of focal plane indicators at a plurality of depths within the 3D map.

In one or more embodiments of the system, the rendering the MR object along the visual guidance line pathway at the location corresponding to the direction of the user's gaze includes moving the enhancement object along the plurality of focal plane indicators at the plurality of depths to enlarge the MR object.

In one or more embodiments of the system, the guiding the action of the user along the visual guidance line pathway at the one or more identified focal points includes providing the visual cue, wherein the visual cue includes a next suggested action for the user.

In one or more embodiments of the system, the displaying the visual guidance line pathway in the 3D map includes determining a depth-wise location of a gaze point of a user based on eye gaze direction and eye vergence.

Another embodiment is directed to a method for rendering a visual guidance pathway including forming a three-dimensional (3D) map of surroundings of a user of an augmented reality (AR) head mounted display (HMD); determining a depth-wise location of a gaze point of a user based on eye gaze direction and eye vergence; determining a visual guidance line pathway in the 3D map; and rendering one or more mixed reality (MR) objects along the visual guidance line pathway at locations corresponding to a direction of the user's gaze, while avoiding one or more preexisting objects in the 3D map of the surroundings.

In one or more embodiments of the method, the visual guidance line pathway is placed in determined available space within the 3D map of the surroundings.

In one or more embodiments of the method, the one or more preexisting objects include one or more real-world objects and existing MR objects.

What is claimed is:

1. A method comprising:
   forming a three-dimensional (3D) map of surroundings of a user of an augmented reality (AR) head mounted display (HMD);
   selecting a mixed reality (MR) object for placement or repositioning within the 3D map;
   displaying a visual guidance line pathway in the 3D map;
   detecting a gaze of the user at one or more positions along the visual guidance line pathway; and
   rendering the MR object at rendering positions along the visual guidance line pathway corresponding to the one or more detected positions of the gaze of the user.

2. The method of claim 1, further comprising:
   determining the visual guidance line pathway in the 3D map; and
   determining the gaze of the user at the one or more positions along the visual guidance line pathway,
   wherein determining the gaze of the user at the one or more positions along the visual guidance line pathway comprises any one of:
   determining the one or more positions by gaze tracking of the user,
   determining the one or more positions according to one or more hardware restrictions of the AR HMD,
   determining the one or more positions based on a number of visually correct focal planes capable of being displayed by the AR HMD,
   determining the one or more positions based on a determined accuracy of gaze tracking available on the AR HMD,
   determining the one or more positions according to a distance of the MR object, or
   determining the one or more positions by a movement of the user.

3. The method of claim 2, wherein determining the visual guidance line pathway in the 3D map comprises any one of:
   determining the visual guidance line pathway based on a depth-wise location of a gaze point of the user and available space in the 3D map,
   determining the visual guidance line pathway by forming the visual guidance line pathway to avoid one or more identified objects in the 3D map,
   determining the visual guidance line pathway by altering the visual guidance line pathway according to pivot points determined by a user gaze, or
   determining the visual guidance line pathway by altering the visual guidance line pathway according to movements of the user, the movements of the user comprising one or more of a head tilt, a head pitch, a head yaw, and a gesture.

4. The method of claim 1, wherein the visual guidance line pathway is a straight line occupying multiple depths relative to the user.

5. The method of claim 1, wherein the visual guidance line pathway is a curved line displayed in 3D space.

6. The method of claim 1, wherein the visual guidance line pathway is displayed with multiple point markers, the multiple point markers identifying the rendering positions at which the MR object is available to be rendered.

7. The method of claim 1, wherein the multiple point markers correspond to discrete focal planes supported by an optical system of the HMD.

8. The method of claim 1, further comprising determining the visual guidance line pathway to avoid objects in the 3D map.

9. The method of claim 1, further comprising determining the visual guidance line pathway to avoid additional MR objects displayed for the user by the HMD.

10. The method of claim 1, wherein selecting the MR object comprises:
 identifying an object in a view of the user for which content enhancement is available; and
 selecting an available content enhancement object for the identified object to be the selected MR object.

11. The method of claim 1, further comprising:
 detecting a gaze point of the user,
 wherein selecting the MR object is based on a detected gaze point of the user.

12. The method of claim 1, wherein rendering the MR object at the rendering positions along the visual guidance line pathway changes a depth at which the MR object is rendered relative to the user.

13. The method of claim 1, further comprising:
 displaying a visual cue that a content enhancement is available to the user for an object corresponding to the MR object,
 wherein selecting the MR object comprises activating content enhancement for the object.

14. The method of claim 1, wherein rendering the MR object further comprises:
 rendering one or more MR objects along the visual guidance line pathway at locations corresponding to a direction of the gaze of the user, while avoiding one or more preexisting objects in the 3D map of the surroundings, wherein the visual guidance line pathway is placed in determined available space within the 3D map of the surroundings, and wherein the one or more preexisting objects comprise at least one of a real-world object or an existing MR object.

15. A system comprising:
 a processor; and
 a non-transitory computer-readable storage medium storing instructions operative, when executed by the processor, to cause the system to:
 form a three-dimensional (3D) map of surroundings of a user of an augmented reality (AR) head mounted display (HMD);
 select a mixed reality (MR) object for placement or repositioning within the 3D map;
 display a visual guidance line pathway in the 3D map;
 detect a gaze of the user at one or more positions along the visual guidance line pathway; and
 render the MR object at rendering positions along the visual guidance line pathway corresponding to the one or more detected positions of the gaze of the user.

16. The system of claim 15, wherein displaying the visual guidance line pathway in the 3D map comprises:
 displaying the one or more identified focal points as a plurality of focal plane indicators at a plurality of depths within the 3D map.

17. The system of claim 15, wherein the instructions are further operative, when executed by the processor, to cause the system to:
 display a visual cue that a content enhancement is available to the user for an object corresponding to the MR object,
 wherein activating the MR object comprises activating the content enhancement for the object.

18. The system of claim 15, wherein the instructions are further operative, when executed by the processor, to cause the system to:
 prior to activating, display the object corresponding to the MR object in the 3D map along with the visual cue.

19. The system of claim 15, wherein the object corresponding to the MR object comprises one of a virtual object, a pre-existing real world object, or an MR object.

20. The system of claim 17, wherein activating the MR object further comprises activating the content enhancement for the object corresponding to the MR object according to the user input to the AR HMD with respect to the visual cue.

* * * * *